(12) United States Patent
Sugiyama

(10) Patent No.: US 8,086,078 B2
(45) Date of Patent: Dec. 27, 2011

(54) ELECTRONIC DEVICE

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 436 days.

(21) Appl. No.: 12/472,924

(22) Filed: May 27, 2009

(65) Prior Publication Data

US 2010/0067840 A1   Mar. 18, 2010

(30) Foreign Application Priority Data

Sep. 17, 2008 (JP) ................. 2008-237314

(51) Int. Cl.
*G02F 1/035* (2006.01)
(52) U.S. Cl. .............. 385/2; 385/1; 385/4; 385/8; 385/9
(58) Field of Classification Search .................. 385/1, 2, 385/4, 8, 9
See application file for complete search history.

(56) References Cited

U.S. PATENT DOCUMENTS

| | | | |
|---|---|---|---|
| 6,115,520 A * | 9/2000 | Laskowski et al. | 385/50 |
| 7,400,786 B1 | 7/2008 | Sugiyama | |
| 7,817,879 B2 * | 10/2010 | Sugiyama | 385/9 |
| 2010/0264855 A1 * | 10/2010 | Kinpara et al. | 315/363 |

OTHER PUBLICATIONS

Patent Abstracts of Japan, Japanese Publication No. 2008-58436 (published Mar. 13, 2008).

* cited by examiner

*Primary Examiner* — Jennifer Doan
(74) *Attorney, Agent, or Firm* — Staas & Halsey LLP

(57) ABSTRACT

An electronic device in which a signal electrode has a bent portion. Earth electrodes are formed with the signal electrode between. A width of a gap at the bent portion between the signal electrode and each earth electrode is narrower than a width of a gap at both ends of the bent portion between the signal electrode and each earth electrode.

26 Claims, 22 Drawing Sheets

ELECTRONIC DEVICE

CROSS-REFERENCE TO RELATED APPLICATIONS

This application is based upon and claims the benefit of priority of the prior Japanese Patent Application No. 2008-237314, filed on Sep. 17, 2008, the entire contents of which are incorporated herein by reference.

FIELD

The embodiments discussed herein are related to an electronic device including an electrode having a bent portion.

BACKGROUND

Each optical communication apparatus includes an optical modulator which modulates light by making use of an electro-optic effect. Such an optical modulator is, for example, an optical waveguide device which modulates continuous wave (CW) light output from a laser by an electrical signal and which outputs the CW light (see, for example, Japanese Laid-open Patent Publication No. 2008-58436).

FIG. 22 is a plan view of an optical waveguide device. With an optical waveguide device depicted in FIG. 22, an optical waveguide 102 is formed over a dielectric substrate 101 which has an electro-optic effect, and an electrode 103 is formed over the optical waveguide 102. This optical waveguide device is a dual drive type optical modulator. Electric fields are formed on two waveguides 102a and 102b parallel to each other by two signal electrodes 103a and 103b respectively. By doing so, input light IN output from a laser is modulated and output light OUT is obtained.

With the optical waveguide device depicted in FIG. 22, positive data Data and negative data Data (indicated by Data with a bar in FIG. 22) which are complementary electrical signals are input to the two signal electrodes 103a and 103b, respectively, so that the optical waveguide device will perform push-pull operation. At this time it is necessary to modulate light propagating through the two waveguides 102a and 102b parallel to each other at the same timing. To be concrete, it is necessary that the data Data input to the signal electrodes 103a and 103b reach the parallel waveguides 102a and 102b at the same timing at a line 104 indicated in FIG. 22.

Therefore, the length of feed portions of the signal electrodes 103a and 103b from portions to which the data Data is input to the parallel waveguides 102a and 102b is adjusted. By doing so, the timing at which the data Data that are complementary electrical signals reaches the parallel waveguides 102a and 102b is adjusted. For example, as indicated in a frame 105 of the FIG. 22, the signal electrode 103b is bent to adjust the timing at which the data Data reaches the parallel waveguides 102a and 102b.

Plural intrinsic modes of a microwave can propagate through the substrate 101. The distribution of an electric field and propagation speed for each intrinsic mode depend on the shape of a section of a chip. Coupling between a coplanar mode propagating through an electrode and an intrinsic mode (undesired mode) occurs at a frequency and loss occurs. This coupling tends to occur at a bend where the direction in which the coplanar mode propagates changes. As a result, loss tends to occur at a bend in the electrode. The more significantly an electric field of the coplanar mode overlaps with an electric field of the undesired mode, the stronger the coupling becomes. As an electric field of the coplanar mode spreads, usually the coupling becomes stronger. Therefore, as a gap between a signal electrode and an earth electrode becomes wider, loss becomes heavier. With an electronic device for which light is not used, a dielectric substrate through which light does not pass may be used.

However, a bent portion of an electrode differs from a straight portion in electric field distribution, so signal loss occurs.

SUMMARY

According to one aspect of the embodiment, an electronic device includes a signal electrode having a bent portion and earth electrodes formed with the signal electrode between, a gap at the bent portion between the signal electrode and each earth electrode being narrower than a gap at both ends of the bent portion between the signal electrode and each earth electrode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Figure 1:
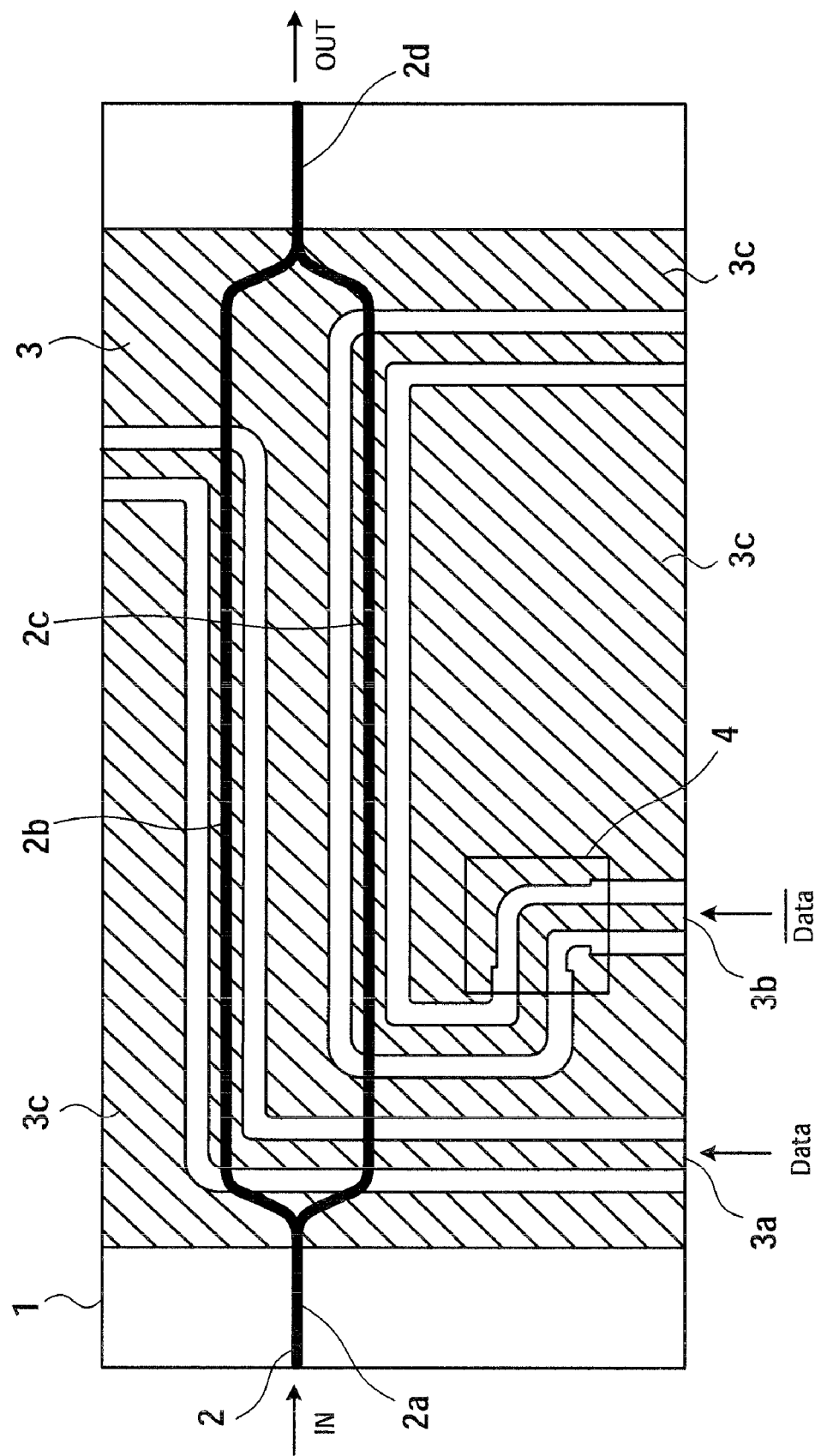
FIG. 1 is a plan view of an optical waveguide device according to a first embodiment.

A first embodiment will now be described in detail with reference to the accompanying drawings, wherein like reference numerals refer to like elements throughout.

FIG. 1 is a plan view of an optical waveguide device according to a first embodiment. With an optical waveguide device depicted in FIG. 1, an optical waveguide 2 is formed over a dielectric substrate 1 (in an area of the dielectric substrate 1 near the surface). The dielectric substrate 1 is made of an electro-optic crystal such as $LiNbO_3$ or $LiTaO_2$.

The optical waveguide 2 includes an input waveguide 2a, parallel waveguides 2b and 2c, and an output waveguide 2d. The optical waveguide 2 is formed by forming a metal film of titanium (Ti) or the like over part of the dielectric substrate 1 and performing thermal diffusion of titanium. The optical waveguides 2 may be formed by making a proton exchange in benzoic acid after patterning.

An electrode 3 indicated by oblique lines includes signal electrodes 3a and 3b through which electrical signals (data) propagate and earth electrodes 3c. The electrode 3 is a coplanar electrode. If a z-cut substrate is used as the dielectric substrate 1, a change in refractive index caused by a z-direction electric field is used. Therefore, the electrode 3 is formed over the optical waveguide 2. A pattern of the electrode 3 is formed over the optical waveguide 2. However, in order to prevent light propagating through the parallel waveguides 2b and 2c from being absorbed by the electrode 3, a buffer layer is formed between the dielectric substrate 1 and the electrode 3. For example, a $SiO_2$ film with a thickness of about 0.2 to 2 μm is used as the buffer layer.

The optical waveguide device depicted in FIG. 1 is a dual drive type optical modulator. Electric fields are formed on the two parallel waveguides 2b and 2c by the two signal electrodes 3a and 3b respectively. By doing so, input light IN output from a laser is modulated and output light OUT is obtained.

When the optical waveguide device is driven at a high speed, traveling-wave type electrodes are formed by connecting ends of the signal electrodes 3a and 3b and the earth electrodes 3c via resistors and a microwave signal is applied from an input side. At this time refractive indexes in the parallel waveguides 2b and 2c change to +Δna and −Δnb, respectively, because of the electric fields. As a result, while the input light IN is propagating through the parallel waveguides 2b and 2c, a phase difference changes. Accordingly, the intensity-modulated output light OUT is output from the output waveguide 2d because of Mach-Zehnder interference. The effective refractive index of a microwave is controlled by changing the shape of a section of each of the signal electrodes 3a and 3b. The speed of light is made to match the speed of the microwave. By doing so, high-speed optical response characteristics can be obtained.

As indicated in a frame 4 of FIG. 1, the signal electrode 3b of the optical waveguide device is bent. That is to say, the optical waveguide device includes a delay region by which timing at which the data Data reaches the parallel waveguides 2b and 2c is adjusted. A gap at a bent portion between the signal electrode 3b and the earth electrode 3c is narrower than the gap in another area between the signal electrode 3b and the earth electrode 3c so that microwave signal loss will be controlled.

Figure 2:
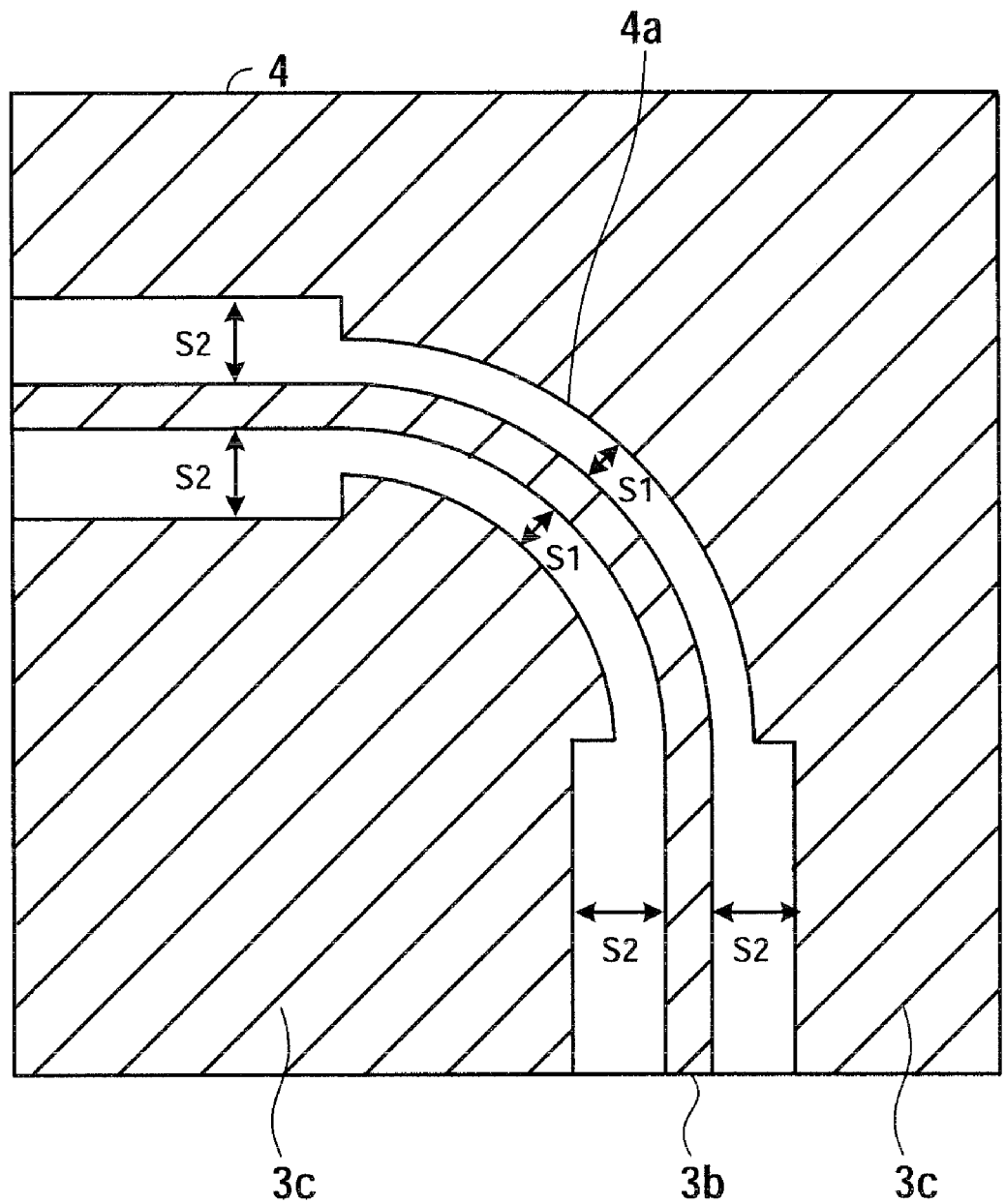
FIG. 2 is an enlarged view of a delay region.

FIG. 2 is an enlarged view of the delay region. A delay region depicted in FIG. 2 is obtained by enlarging the delay region depicted in the frame 4 of FIG. 1. Members in FIG. 2 that are the same as those depicted in FIG. 1 are marked with the same symbols and descriptions of them will be omitted.

In order to adjust the timing of the data Data, the signal electrode 3b has a bent portion (bend) 4a. As depicted in FIG. 2, for example, the direction of the signal electrode 3b is changed at the bend 4a by 90°.

Width S1 of a gap at the bend 4a between the signal electrode 3b and the earth electrode 3c is narrower than the width S2 of the gap in another area (straight area of a feeder) between the signal electrode 3b and the earth electrode 3c. That is to say, the signal electrode 3b and the earth electrode 3c are formed so that the condition S1<S2 will be met. By making the gap at the bend 4a between the signal electrode 3b and the earth electrode 3c narrower than the gap in another area between the signal electrode 3b and the earth electrode 3c, the distribution (spread) of an electric field at the bend 4a can be controlled and signal loss can be reduced.

Figure 3:
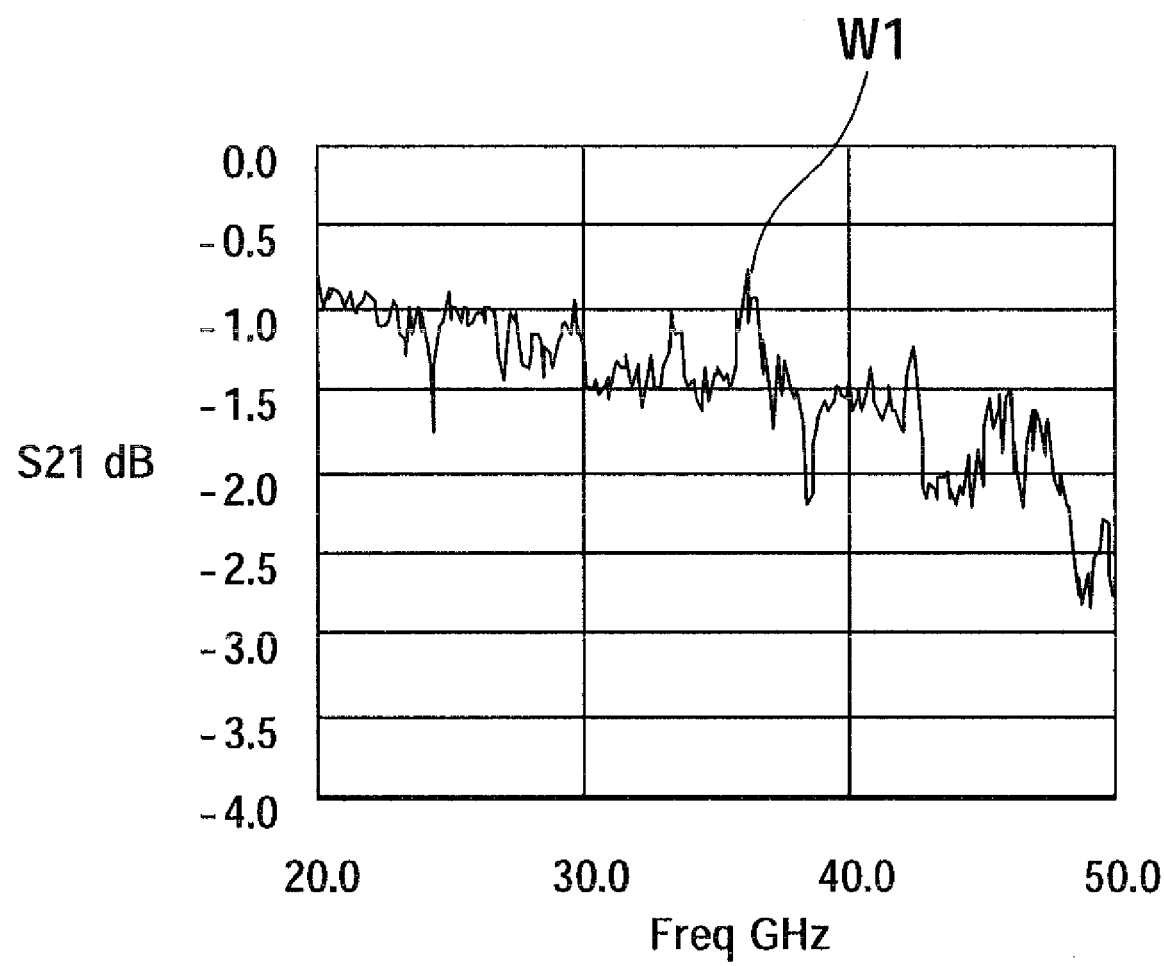
FIG. 3 illustrates signal loss which occurs in the case of a gap at a bend being made narrow.
Figure 4:
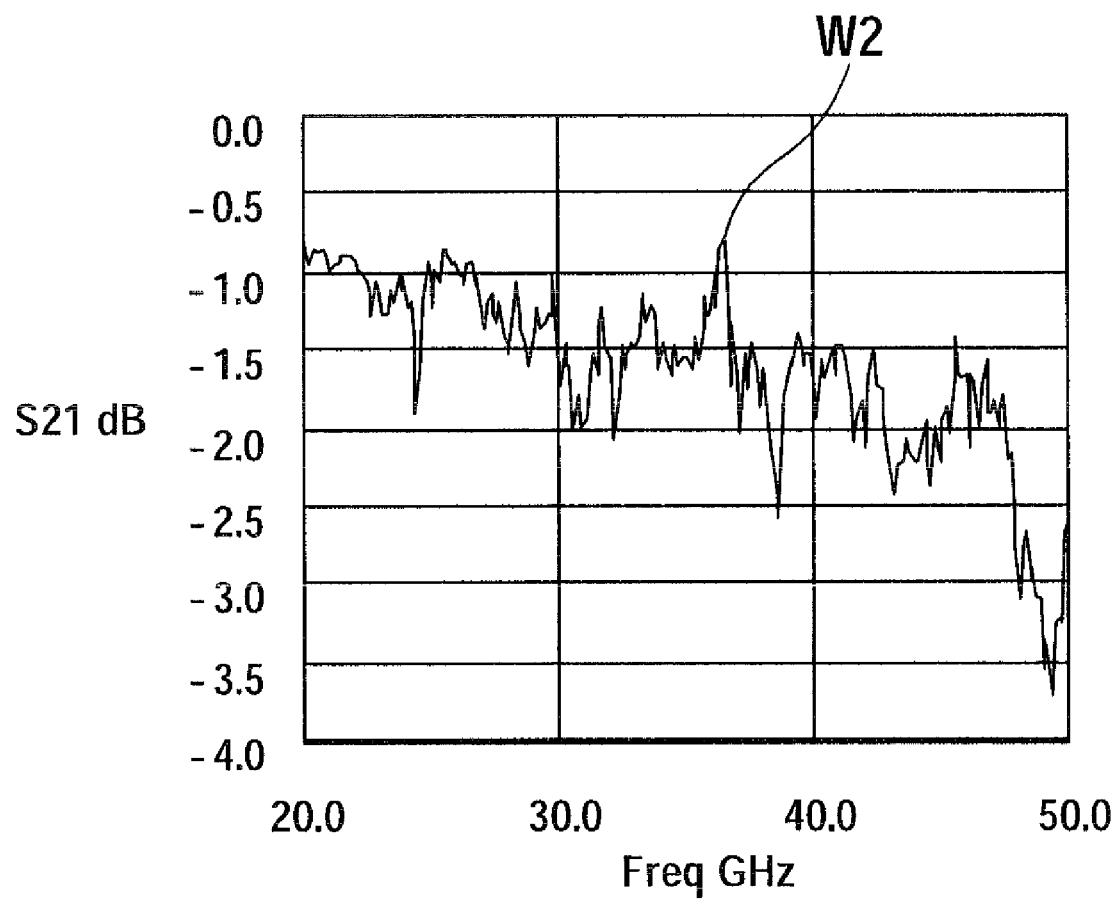
FIG. 4 illustrates signal loss which occurs in the case of the gap at the bend not being made narrow.

FIG. 3 illustrates signal loss which occurs in the case of the gap at the bend being made narrow. FIG. 4 illustrates signal loss which occurs in the case of the gap at the bend not being made narrow. In each of FIGS. 3 and 4, a horizontal axis indicates a frequency and a vertical axis indicates S21 of S parameters (which indicates electrical signal loss and which is equal to (output power)/(input power)).

In FIG. 2, the gap at the bend 4a is narrower than the gap in another area. As indicated by a waveform W1 of FIG. 3, partial loss in the power of an electrical signal input to the signal electrode 3b is controlled, compared with a waveform W2 of FIG. 4 which is obtained in the case of the gap at the bend 4a not being made narrow. In addition, power loss in a high-frequency band is reduced.

As stated above, the gap at the bend 4a between the signal electrode 3b and the earth electrode 3c is made narrower than the gap in another area between the signal electrode 3b and the earth electrode 3c. By doing so, the distribution of an electric field at the bend 4a can be controlled and signal loss at the bend 4a can be reduced.

In addition, by controlling the distribution of an electric field, crosstalk with another signal or interference with light can be controlled. Controlling the distribution of an electric field is effective, for example, in the case where a plurality of optical waveguides 2 are formed over the dielectric substrate 1 and where a plurality of signal electrodes are formed.

If the dielectric substrate 1 is made of a ferroelectric such as $LiNbO_3$ or $LiTaO_2$, the characteristic impedance of the signal electrodes 3a and 3b is low. In order to make the characteristic impedance of the signal electrodes 3a and 3b high, a gap between the signal electrode 3a and the earth electrode 3c and a gap between the signal electrode 3b and the earth electrode 3c are made wide. As a result, if the dielectric substrate 1 is made of a ferroelectric, signal loss at the bend 4a in the signal electrode 3b increases. By making the gap at the bend 4a between the signal electrode 3b and the earth electrode 3c narrow, however, signal loss at the bend 4a can be reduced effectively.

Furthermore, in order to enhance the effect of reducing signal loss which is obtained by making the gap at the bend 4a narrow, the gap at the bend 4a is made narrower than the thickness of the dielectric substrate 1. The reason for this is as follows. If the gap at the bend 4a is wider than the thickness of the dielectric substrate 1, then the distribution of an electric field reaches ground formed on a reverse of the dielectric substrate 1. As a result, the effect obtained by making the gap at the bend 4a narrow lessens. If a ground layer is formed in the dielectric substrate 1, the gap at the bend 4a is made narrower than the distance between the signal electrode 3a and the ground layer formed in the dielectric substrate 1 and the distance between the signal electrode 3b and the ground layer formed in the dielectric substrate 1.

If the gap at the bend 4a is made narrow, the impedance of the signal electrode 3b at the bend 4a becomes low and the problem of the reflection of a signal may arise. In this case, the width of the signal electrode 3b at the bend 4a is made narrower than the width of the signal electrode 3b in another area (portion of the signal electrode 3b except at the bend 4a). By doing so, a drop in impedance can be controlled and therefore the reflection of a signal can be controlled.

In the above description the gap at the bend 4a in the signal electrode 3b depicted in the frame 4 of FIG. 1 is made narrow. However, the same applies to a bend in the signal electrode 3a or another bend in the signal electrode 3b. There is no need to consider electrical signal loss at an end (rear portion where the interference of an electrical signal and light has ended) of an interaction area (corresponding to the parallel waveguides 2b and 2c) where the interference of the electrical signal and light occurs. Therefore, the above description is applicable only to a bend in a front portion of the interaction area.

In addition, the above description is related to the electrode of the optical waveguide device. However, the above description is also applicable to an electrode formed in another electronic device. That is to say, if an electrode formed over or in a substrate of a electronic device has a bent portion, a gap at the bent portion between a signal electrode and an earth electrode may be made narrower than the gap in another area between the signal electrode and the earth electrode. By doing so, signal loss caused by the distribution of an electric field can be reduced.

A second embodiment will now be described. With the optical waveguide device according to the first embodiment, the signal electrode and the earth electrode are formed so that the gap at the bend will change like a step. With an optical waveguide device according to a second embodiment, a signal electrode and an earth electrode are formed so that a gap at a bend will gradually narrow.

Figure 5:
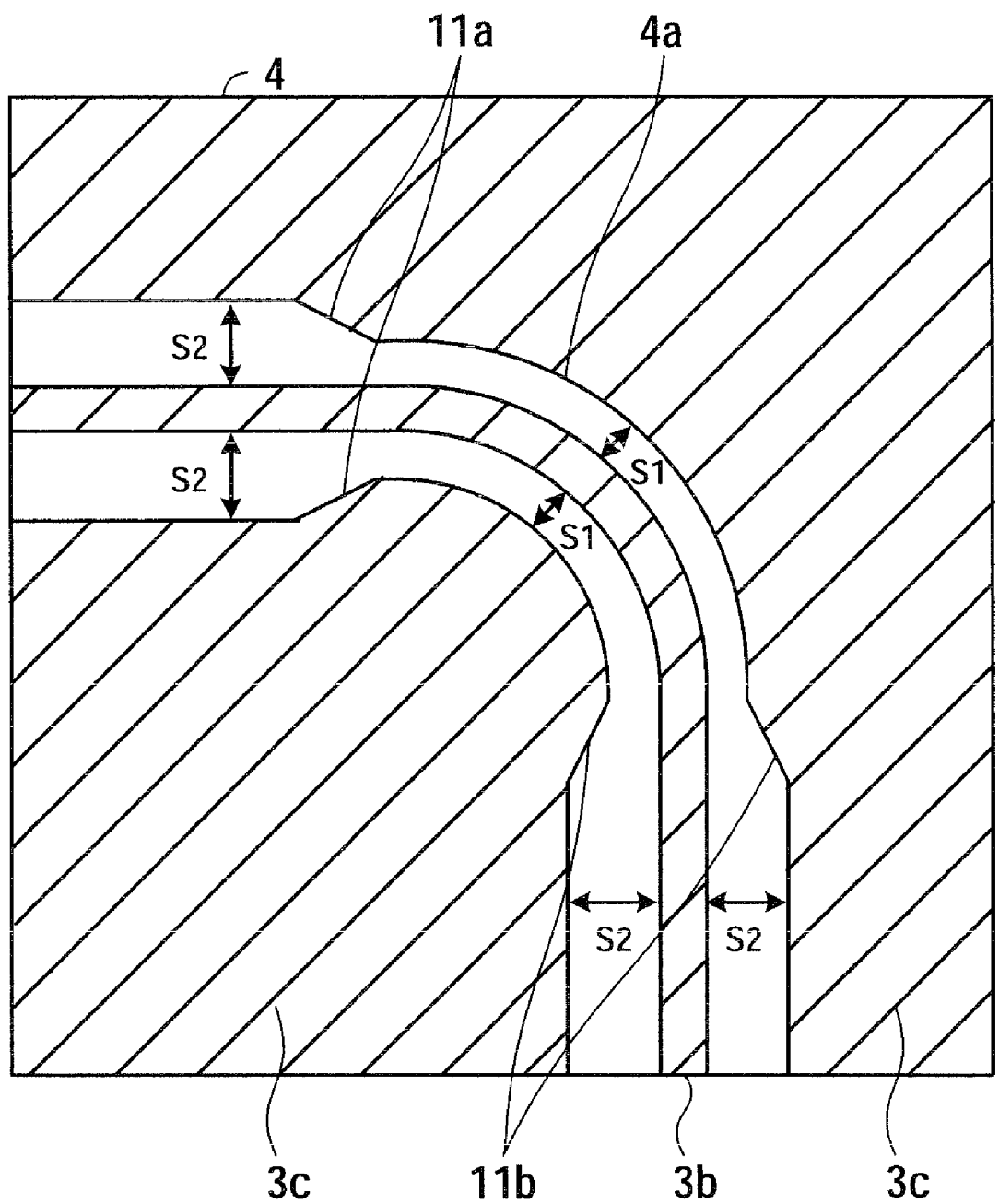
FIG. 5 illustrates a delay region of an optical waveguide device according to a second embodiment.

FIG. 5 illustrates a delay region of an optical waveguide device according to a second embodiment. Members in FIG. 5 that are the same as those depicted in FIG. 2 are marked with the same symbols and descriptions of them will be omitted.

As depicted in FIG. 5, an earth electrode 3c is formed so that a gap will have tapers 11a and 11b at both ends of a bend 4a. The gap at the bend 4a between a signal electrode 3b and the earth electrode 3c has the tapers 11a and 11b and gradually narrows. After the width of the gap changes from S2 to S1, the width of the gap is S1 and is constant.

By gradually narrowing the gap at the bend 4a in this way, signal loss caused by a sudden change in the distribution of an electric field can be reduced.

A third embodiment will now be described. With the optical waveguide device according to the first embodiment, the signal electrode and the earth electrode are formed so that each of the signal electrode and the earth electrode will describe a curve at the bend. With an optical waveguide device according to a third embodiment, a signal electrode and an earth electrode are formed so that the signal electrode and the earth electrode will bend at right angles at a bend.

Figure 6:
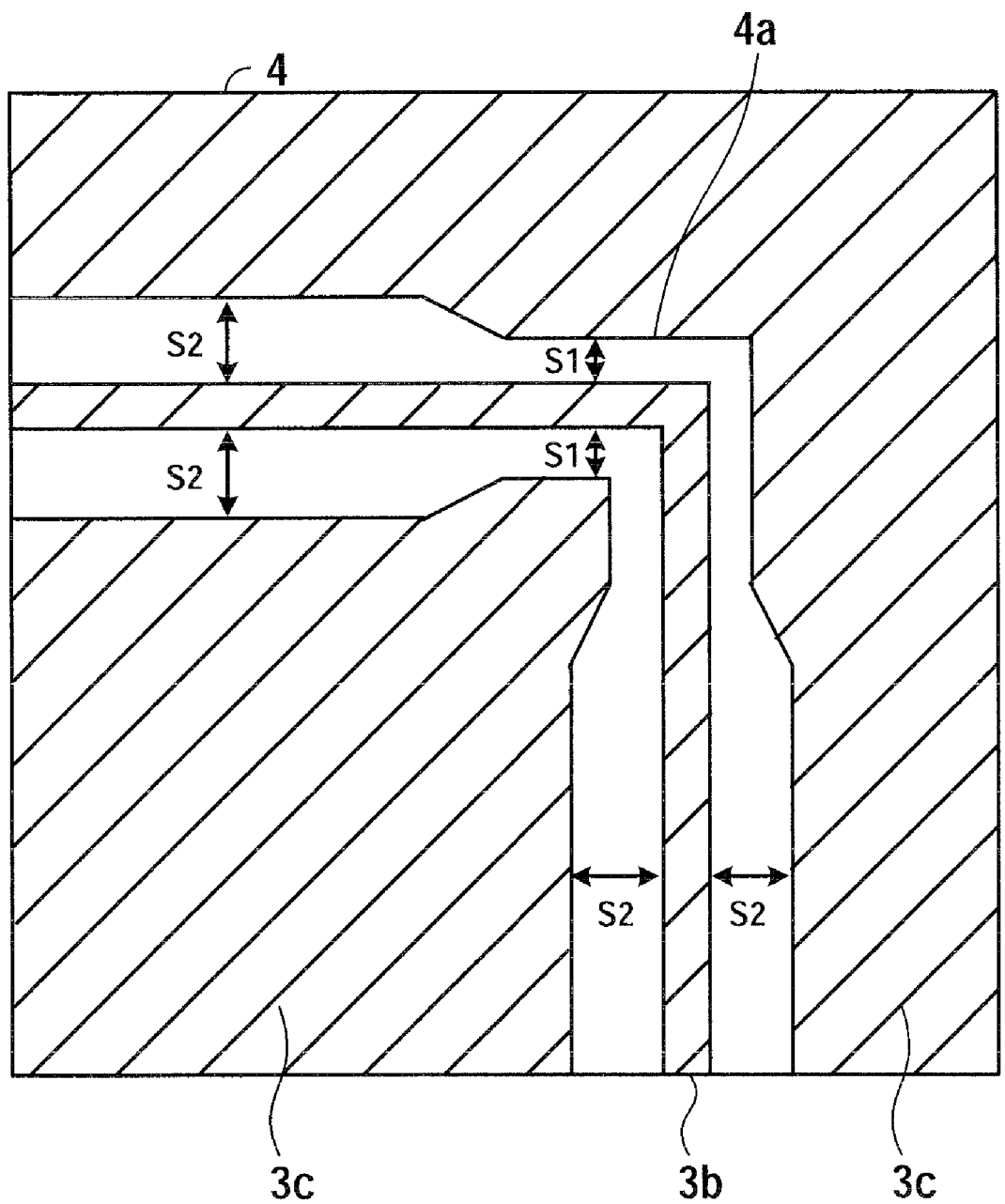
FIG. 6 illustrates a delay region of an optical waveguide device according to a third embodiment.

FIG. 6 illustrates a delay region of an optical waveguide device according to a third embodiment. Members in FIG. 6 that are the same as those depicted in FIG. 5 are marked with the same symbols and descriptions of them will be omitted.

As depicted in FIG. 6, a signal electrode 3b and an earth electrode 3c are formed so that the signal electrode 3b and the earth electrode 3c will bend at right angles at a bend 4a.

The signal electrode 3b and the earth electrode 3c are formed so that the signal electrode 3b and the earth electrode 3c will bend at right angles at the bend 4a. By doing so, a pattern of an electrode 3 can be formed easily. In addition, the area of the bend 4a can be made small.

A fourth embodiment will now be described. With the optical waveguide device according to the first embodiment, both of an outer gap and an inner gap formed at the bend are made narrow. With an optical waveguide device according to a fourth embodiment, only one of two gaps formed at a bend is made narrow.

Figure 7:
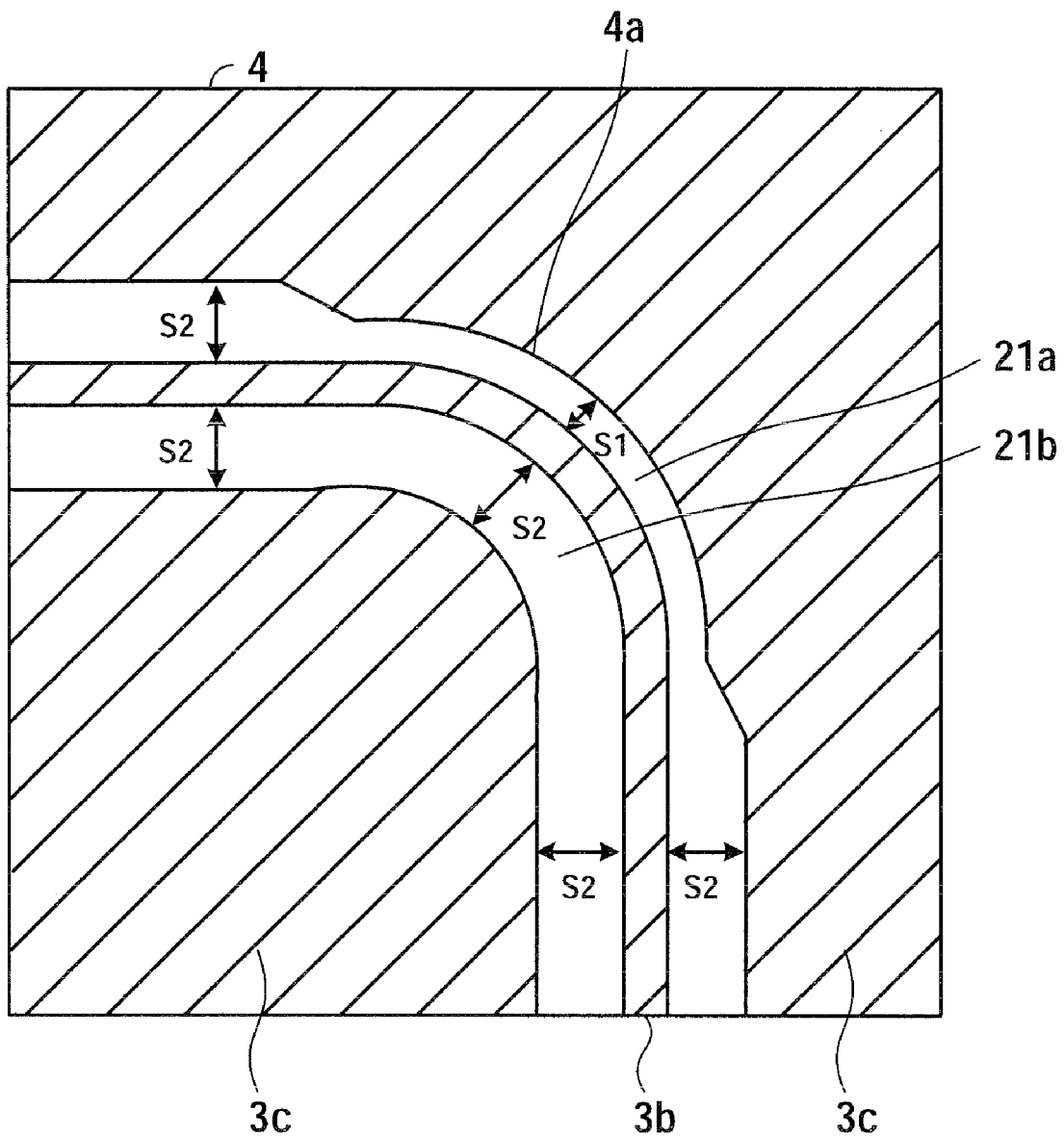
FIG. 7 illustrates a delay region of an optical waveguide device according to a fourth embodiment.

FIG. 7 illustrates a delay region of an optical waveguide device according to a fourth embodiment. Members in FIG. 7 that are the same as those depicted in FIG. 5 are marked with the same symbols and descriptions of them will be omitted.

As depicted in FIG. 7, an outer gap 21a at a bend 4a is narrower than a gap in another area.

An inner gap 21b formed at the bend 4a is equal in width to a gap formed in another area.

That is to say, if the width at the bend 4a of the outer gap 21a is S1 and the width of a gap formed in another area is S2, then S1<S2. The width of the inner gap 21b is S2 and the width of a gap formed in another area is S2. That is to say, S2=S2.

If a portion of a gap between a signal electrode 3b and an earth electrode 3c is made narrow, the impedance of the signal electrode 3b at the narrow gap portion becomes low and the problem of the reflection of a signal may arise. In this case, only the outer gap 21a at the bend 4a is made narrow. By doing so, signal loss can be reduced. In addition, a drop in impedance can be controlled and therefore the reflection of a signal can be controlled.

As stated above, only the outer gap 21a at the bend 4a is made narrow. By doing so, signal loss can be reduced and the reflection of a signal can be controlled.

As described in the first embodiment, a drop in impedance can be controlled by making the width of the signal electrode 3b narrow. However, if the width of the signal electrode 3b is made too narrow, the signal electrode 3b may break. If the above method of making only one of the gaps 21a and 21b at the bend 4a narrow is adopted, there is no need to make the width of the signal electrode 3b narrow. Therefore, the possibility that the signal electrode 3b will break becomes small.

In the above description the outer gap 21a is made narrow. However, only the inner gap 21b may be made narrow. From the viewpoint of reducing signal loss, however, a great effect is obtained by making the outer gap 21a narrow, compared with the case where the inner gap 21b is made narrow.

A fifth embodiment will now be described. With the optical waveguide device according to the fourth embodiment, the outer gap 21a at the bend 4a is made narrow by forming tapers at both ends of the bend 4a. With an optical waveguide device according to a fifth embodiment, a gap is gradually narrowed from both ends of a bend.

Figure 8:
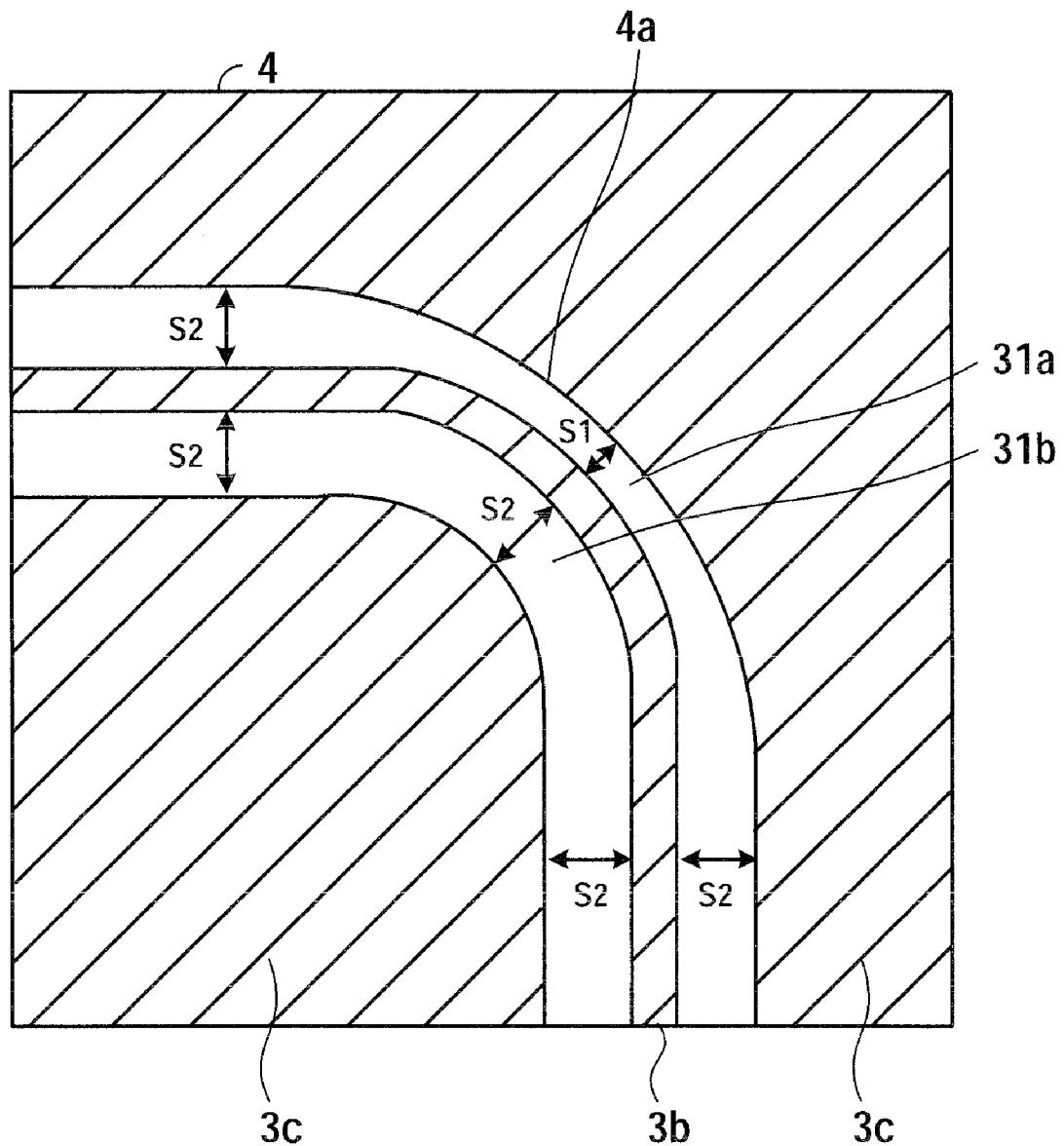
FIG. 8 illustrates a delay region of an optical waveguide device according to a fifth embodiment.

FIG. 8 illustrates a delay region of an optical waveguide device according to a fifth embodiment. Members in FIG. 8 that are the same as those depicted in FIG. 7 are marked with the same symbols and descriptions of them will be omitted.

As depicted in FIG. 8, an outer gap 31a formed at a bend 4a is narrower than a gap formed in another area. The outer gap 31a is formed so that the outer gap 31a will gradually narrow from both ends of the bend 4a. The width of the narrowest portion of the outer gap 31a is S1.

An inner gap 31b formed at the bend 4a is equal in width to a gap formed in another area. That is to say, if the width of the narrowest portion of the outer gap 31a is S1 and the width of a gap formed in another area is S2, then S1<S2. The width of the inner gap 31b is S2 and the width of a gap formed in another area is S2. That is to say, S2=S2.

As stated above, the gap can be formed so that the gap will gradually narrow from both ends of the bend 4a.

A sixth embodiment will now be described. With an optical waveguide device according to a sixth embodiment, the reflection of a signal caused by a drop in impedance is controlled by making the thickness of a signal electrode and an earth electrode at a bend thin.

Figure 9:
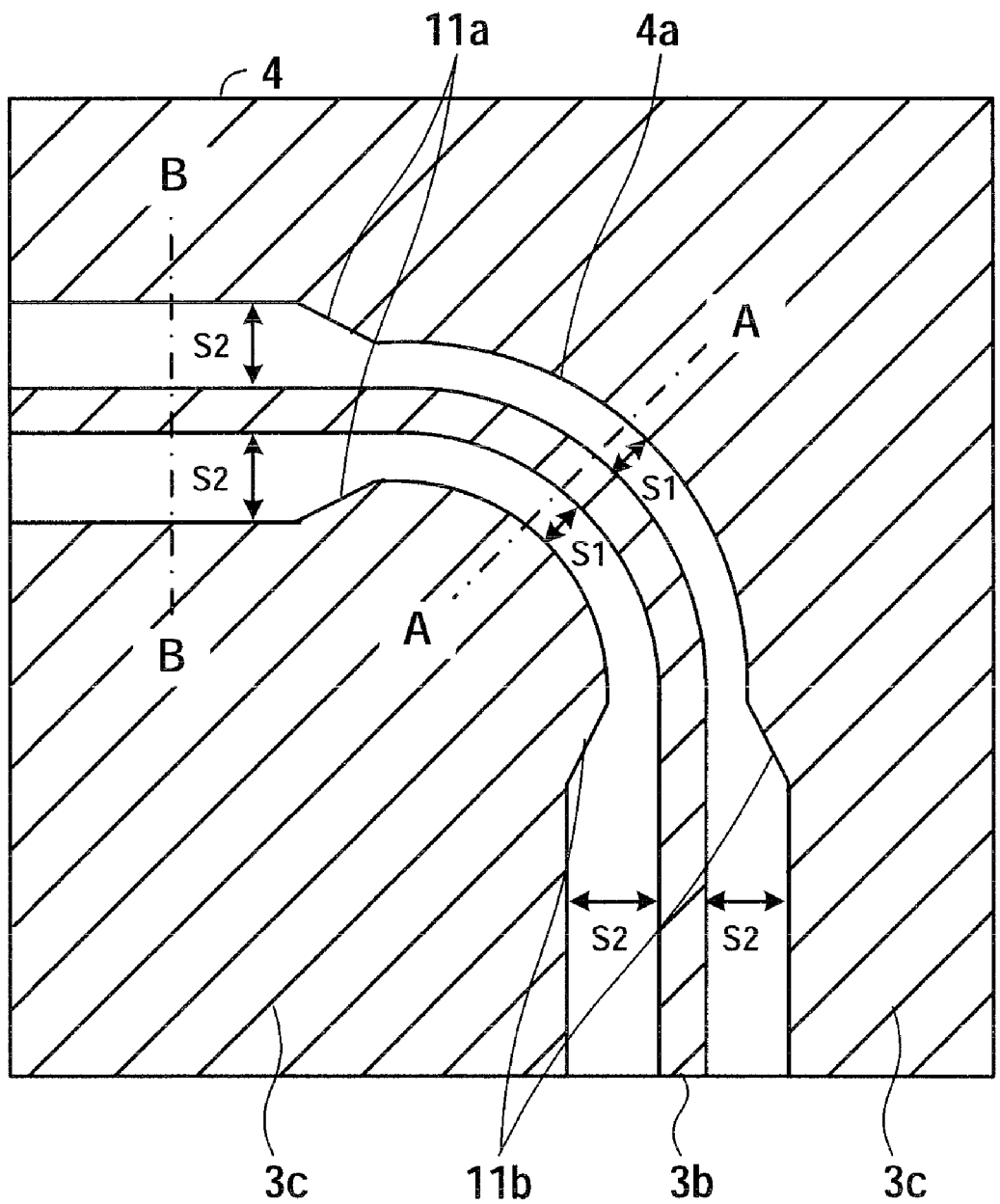
FIG. 9 illustrates a delay region of an optical waveguide device according to a sixth embodiment.
Figure 10:
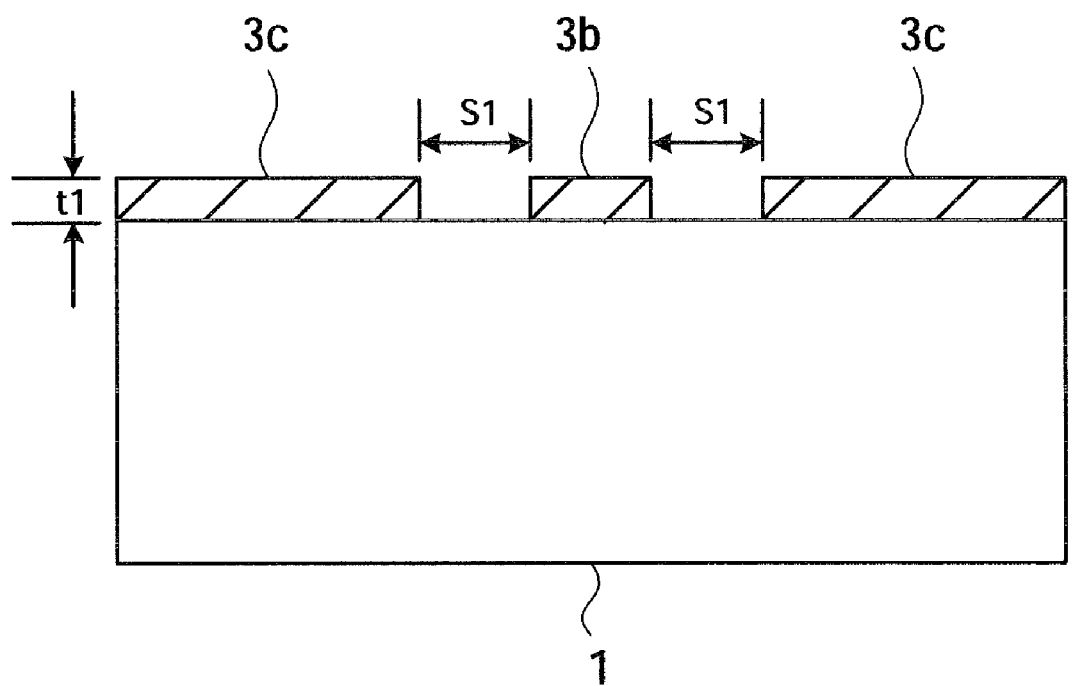
FIG. 10 is a sectional view taken along the line A-A of FIG. 9.
Figure 11:
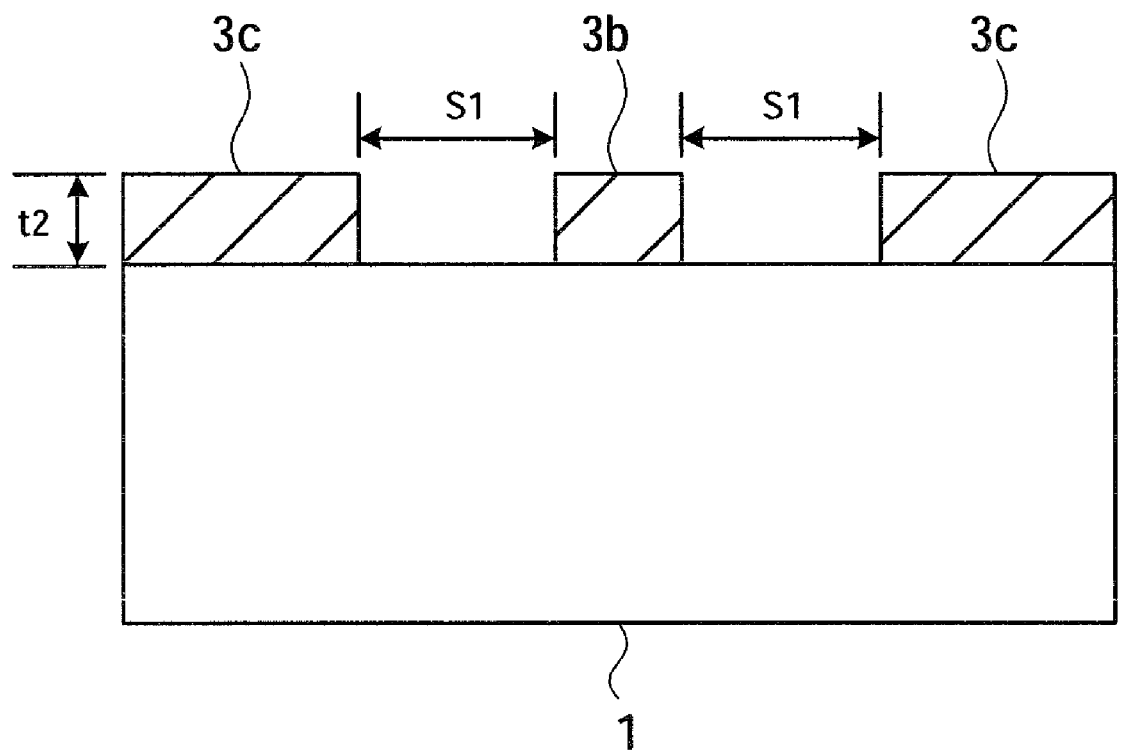
FIG. 11 is a sectional view taken along the line B-B of FIG. 9.

FIG. 9 illustrates a delay region of an optical waveguide device according to a sixth embodiment. FIG. 10 is a sectional view taken along the line A-A of FIG. 9. FIG. 11 is a sectional view taken along the line B-B of FIG. 9. Members in FIGS. 9 through 11 that are the same as those depicted in FIG. 5 are marked with the same symbols and descriptions of them will be omitted.

As depicted in FIG. 10, the thickness of a signal electrode 3b and an earth electrode 3c formed is set to t1 at a bend 4a. For example, the signal electrode 3b and the earth electrode 3c are formed so that the thickness of a bent portion of the signal electrode 3b and the thickness of a portion of the earth electrode 3c of predetermined width which extends along the bent portion of the signal electrode 3b will be t1.

As depicted in FIG. 11, the signal electrode 3b and the earth electrode 3c are formed so that the thickness of a portion except at the bend 4a of each of the signal electrode 3b and the earth electrode 3c will be t2. The relationship between t1 and t2 is t1<t2.

The signal electrode 3b and the earth electrode 3c are formed in this way so that the thickness of the signal electrode 3b and the earth electrode 3c at the bend 4a will be thinner than the thickness of the signal electrode 3b and the earth electrode 3c in another area. By doing so, a drop in impedance at the bend 4a is controlled and therefore the reflection of a signal can be controlled.

In addition, there is no need to narrow the width of the signal electrode 3b. As a result, the possibility that the signal electrode 3b will break becomes small.

In the above description the thickness at the bend 4a of both of the signal electrode 3b and the earth electrode 3c is made thinner than the thickness of the signal electrode 3b and the earth electrode 3c in another area. However, the thickness of only the earth electrode 3c may be made thin. Even in this case, a drop in impedance at the bend 4a can be controlled. Furthermore, the thickness of only the earth electrode 3c is made thin, so the possibility that the signal electrode 3b will break can be decreased.

A seventh embodiment will now be described. With an optical waveguide device according to a seventh embodiment, a buffer layer is formed at a bend between electrodes and a substrate.

Figure 12:
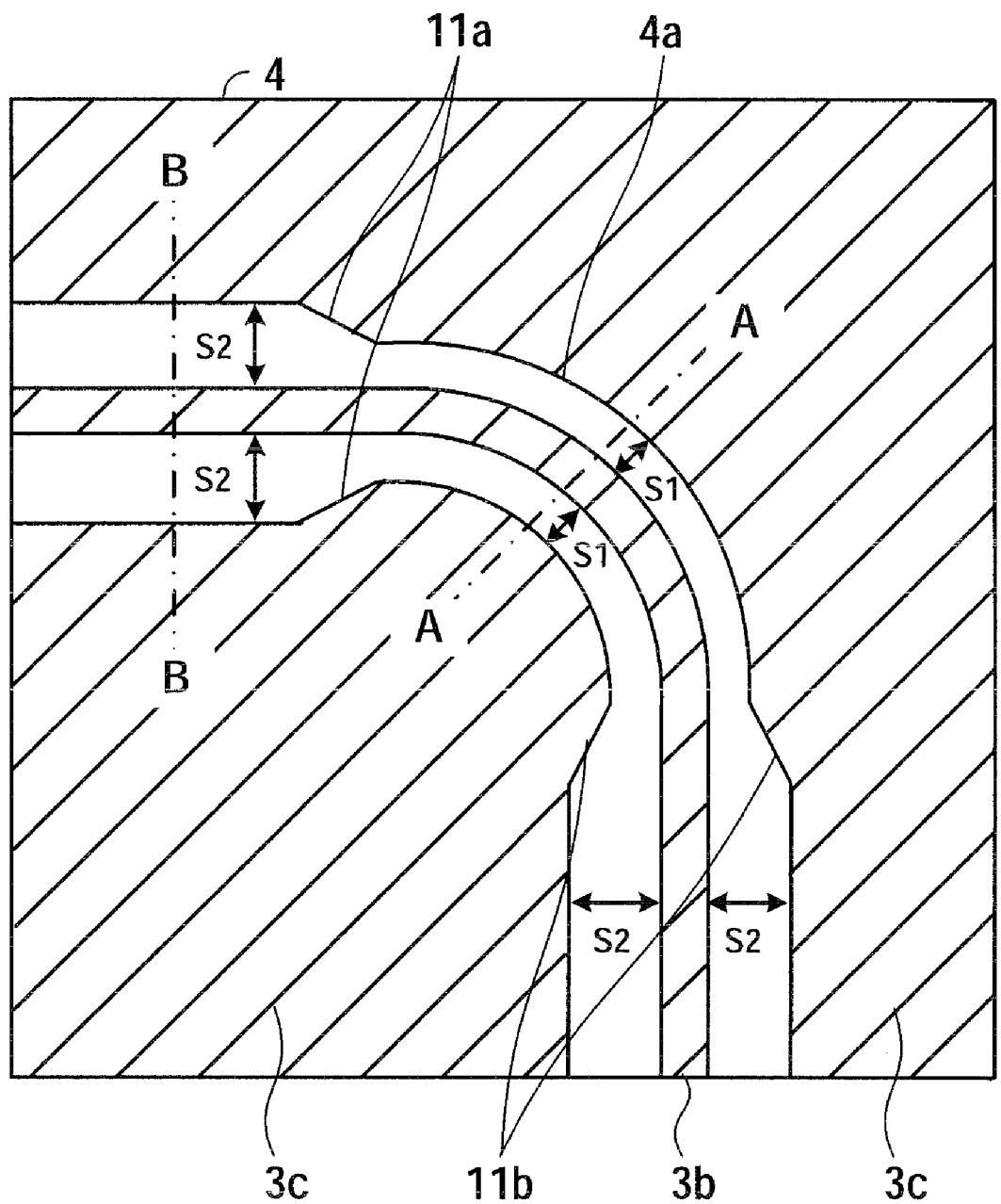
FIG. 12 illustrates a delay region of an optical waveguide device according to a seventh embodiment.
Figure 13:
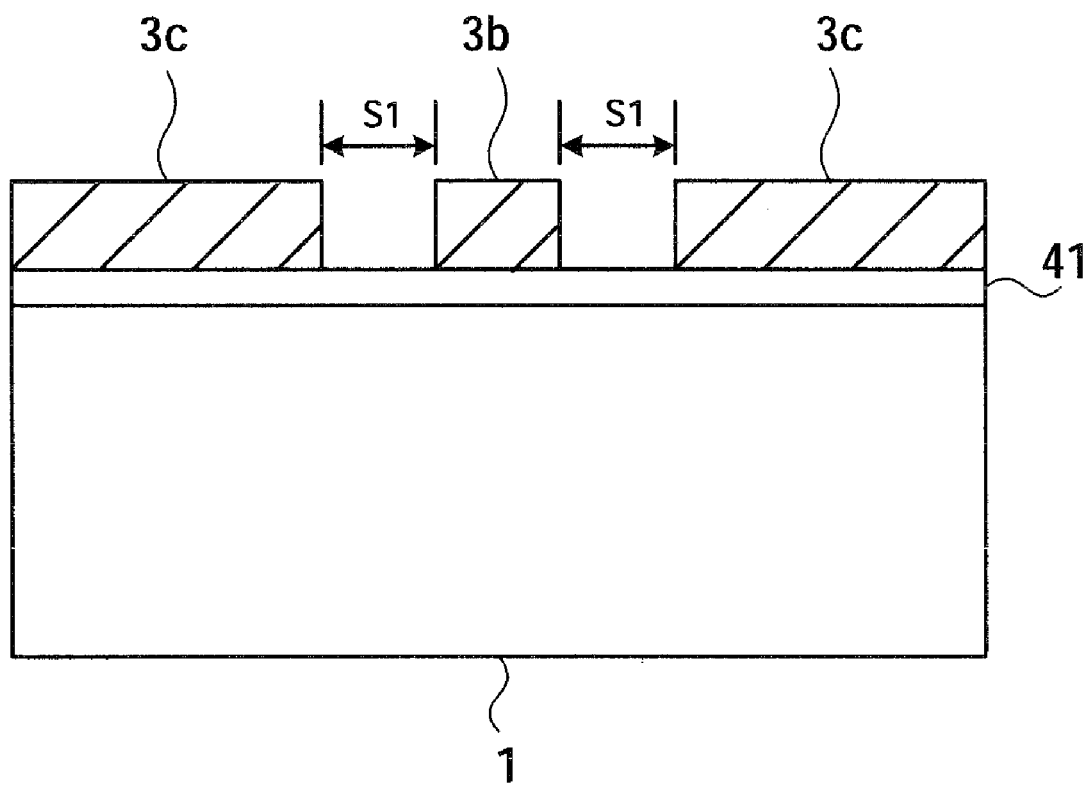
FIG. 13 is a sectional view taken along the line A-A of FIG. 12.

FIG. 12 illustrates a delay region of an optical waveguide device according to a seventh embodiment. FIG. 13 is a sectional view taken along the line A-A of FIG. 12. Members in FIGS. 12 and 13 that are the same as those depicted in FIG. 5 are marked with the same symbols and descriptions of them will be omitted.

As depicted in FIG. 13, a buffer layer 41 is formed at a bend 4a between a substrate 1 and a signal electrode 3b and an earth electrode 3c. The buffer layer 41 is made of, for example, $SiO_2$.

The buffer layer 41 is not formed in an area other than the bend 4a. Accordingly, a sectional view taken along the line B-B of FIG. 12 is the same as that depicted in FIG. 11.

By forming the buffer layer 41 in this way at the bend 4a between the substrate 1 and the signal electrode 3b and the earth electrode 3c, loss in the power of light propagating through an optical waveguide 2 can be reduced. Such loss is caused by the distribution of an electric field at the bend 4a.

A buffer layer may be formed in an entire area except at the bend 4a. In addition, a buffer layer may be formed over an area where loss in the power of light occurs. For example, a buffer layer may be formed over the optical waveguide 2.

Furthermore, a buffer layer is formed in the entire area between the substrate 1 and an electrode 3 and only a portion of the buffer layer under the bend 4a may be made thicker than the rest of the buffer layer.

An eighth embodiment will now be described. With an optical waveguide device according to an eighth embodiment, grooves are formed at a bend. By doing so, a drop in impedance is controlled and the reflection of a signal is controlled.

Figure 14:
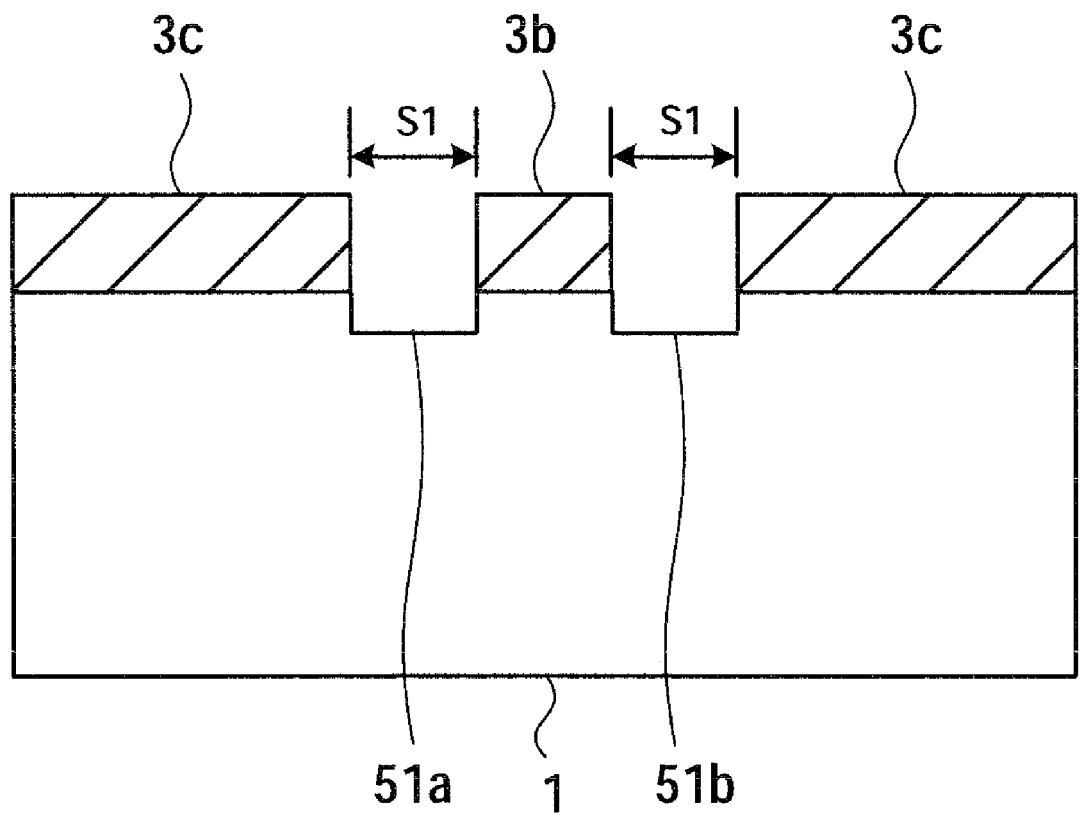
FIG. 14 is a sectional view of a delay region of an optical waveguide device according to an eighth embodiment.

FIG. 14 is a sectional view of a delay region of an optical waveguide device according to an eighth embodiment. A sectional view depicted in FIG. 14 corresponds to, for example, a sectional view taken along the line A-A of FIG. 12. Members in FIG. 14 that are the same as those depicted in FIG. 10 are marked with the same symbols and descriptions of them will be omitted.

As depicted in FIG. 14, grooves 51a and 51b are formed in a substrate 1 at a bend 4a between a signal electrode 3b and an earth electrode 3c. By forming the grooves 51a and 51b, a space occupied by air becomes wider and impedance increases.

Grooves are not formed in gaps except at the bend 4a. Therefore, a sectional view (corresponding to, for example, a sectional view taken along the line B-B of FIG. 12) taken along a line not passing through the bend 4a is the same as that depicted in FIG. 11.

The grooves 51a and 51b are formed in this way in the gaps at the bend 4a between the signal electrode 3b and the earth electrode 3c. By doing so, a drop in impedance at the bend 4a can be controlled and the reflection of a signal can be controlled.

Grooves may be formed in the entire substrate 1 between the signal electrode 3b and the earth electrode 3c. In this case, the grooves 51a and 51b formed in the gaps at the bend 4a between the signal electrode 3b and the earth electrode 3c are made deeper than the grooves formed in another area.

A ninth embodiment will now be described. With an optical waveguide device according to a ninth embodiment, the width of grooves at a bend is made wider than the width of the grooves in another area.

Figure 15:
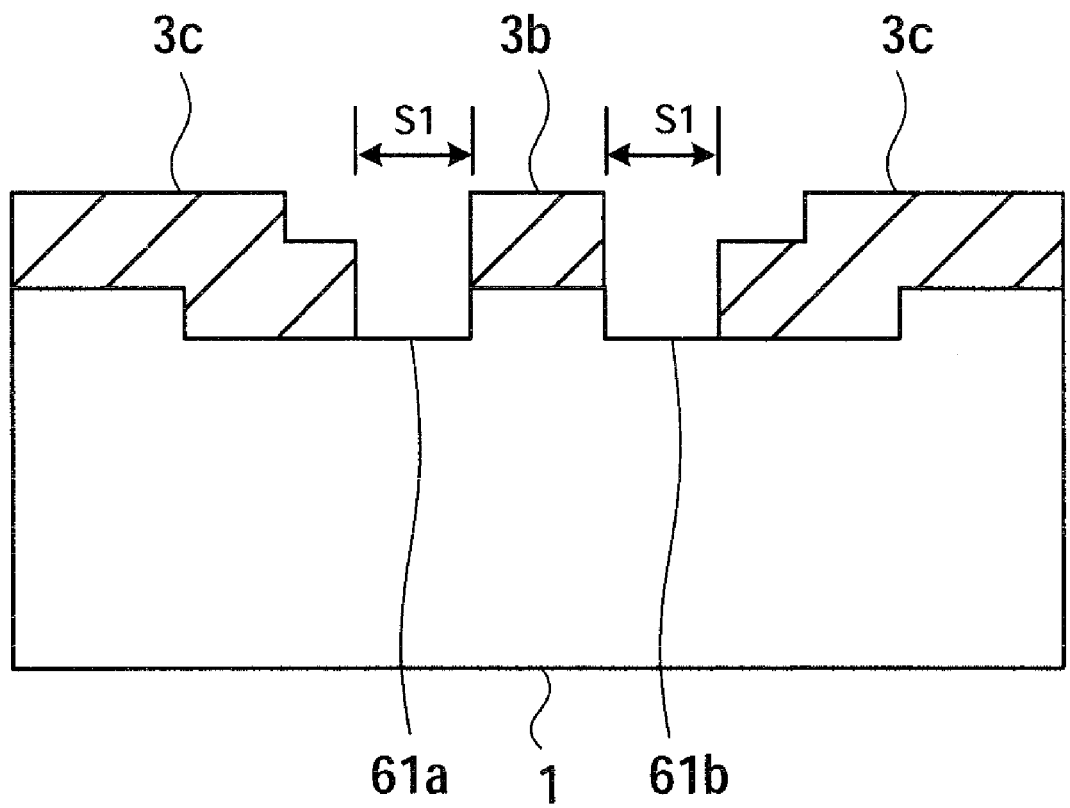
FIG. 15 is a sectional view of a delay region of an optical waveguide device according to a ninth embodiment.

FIG. 15 is a sectional view of a delay region of an optical waveguide device according to a ninth embodiment. A sectional view depicted in FIG. 15 corresponds to, for example, a sectional view taken along the line A-A of FIG. 12. Members in FIG. 15 that are the same as those depicted in FIG. 10 are marked with the same symbols and descriptions of them will be omitted.

Grooves 61a and 61b are formed on both sides of a signal electrode 3b. As depicted in FIG. 15, however, the width of the grooves 61a and 61b at a bend 4a is made wider than the width of the grooves 61a and 61b in another area. As depicted in FIG. 15, an earth electrode 3c is formed in part of the grooves 61a and 61b at the bend 4a the width of which is wider than that of the grooves 61a and 61b in another area.

The width of the grooves 61a and 61b at the bend 4a is made wider than the width of the grooves 61a and 61b in another area in this way. By doing so, a drop in impedance at the bend 4a can be controlled and the reflection of a signal can be controlled.

A tenth embodiment will now be described. With an optical waveguide device according to a tenth embodiment, a signal electrode is formed so that the distance at a bend between the signal electrode and a groove will be shorter than the distance in another area between the signal electrode and the groove.

Figure 16:
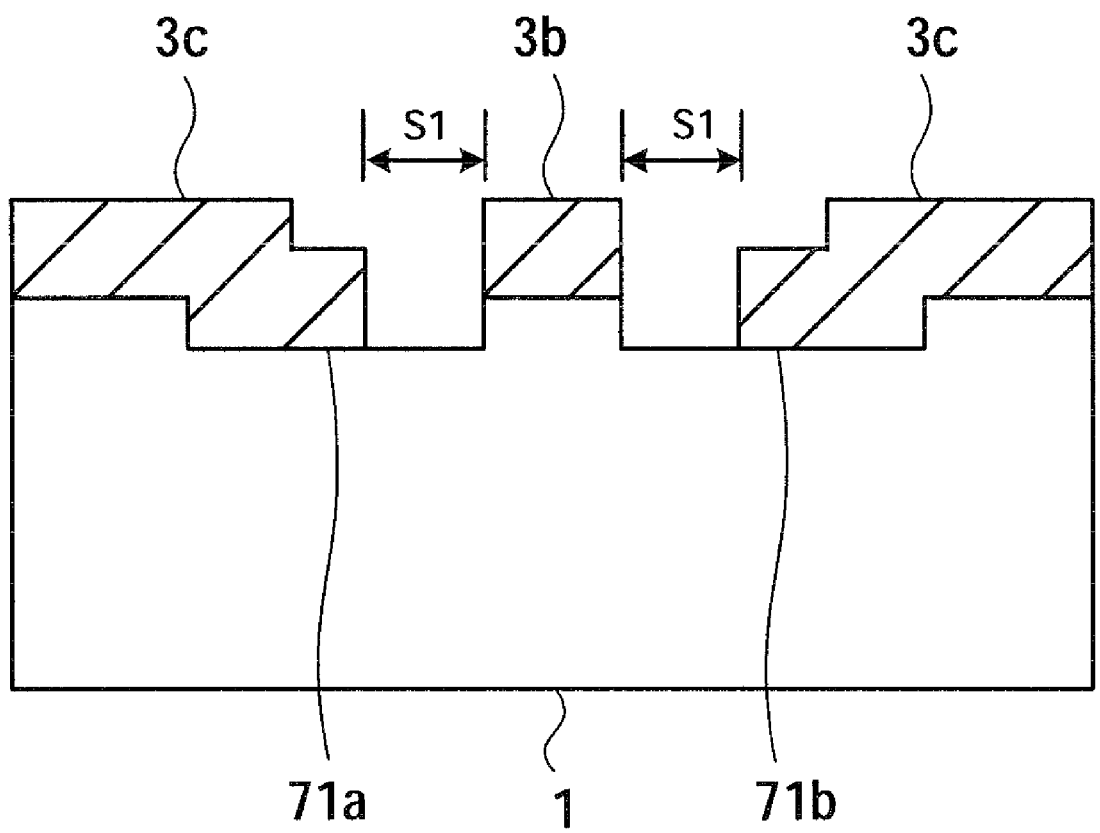
FIG. 16 is a sectional view of a bend of an optical waveguide device according to a tenth embodiment.
Figure 17:
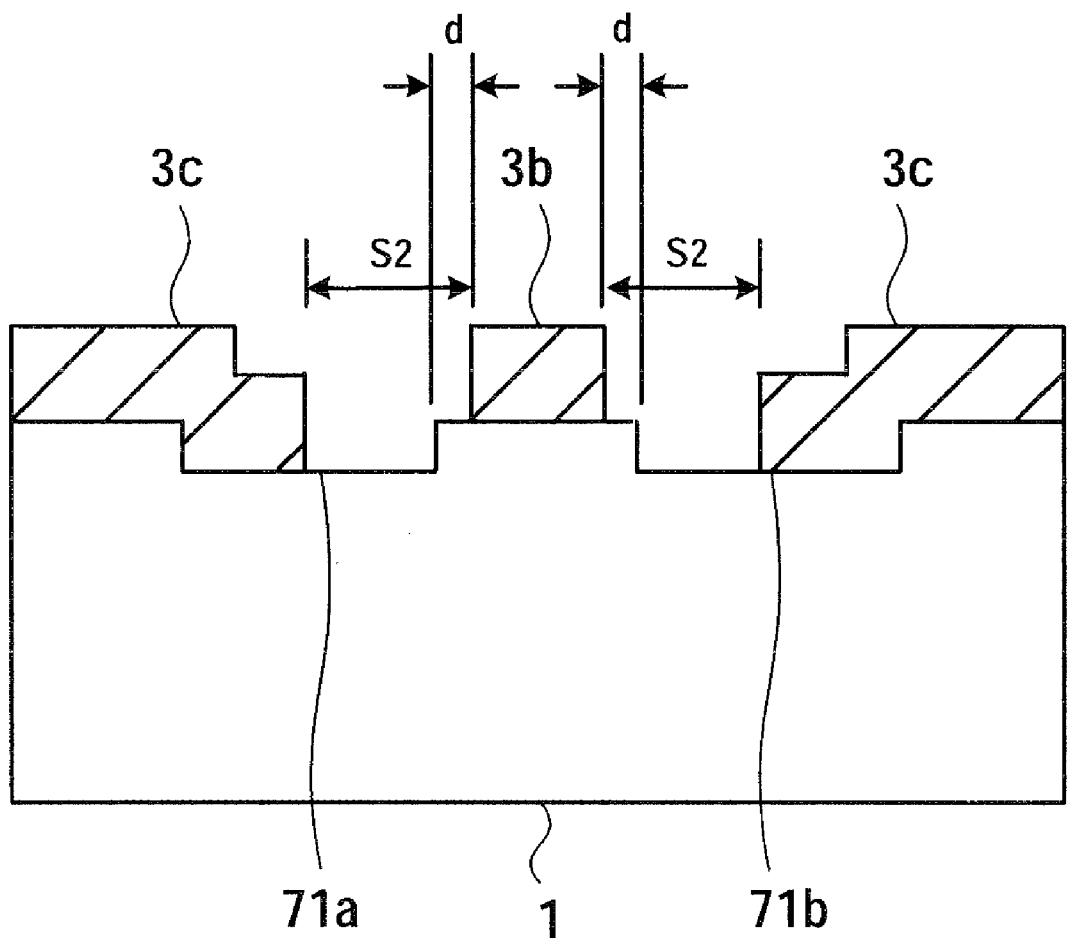
FIG. 17 is a sectional view of a portion other than the bend of the optical waveguide device according to the tenth embodiment.

FIG. 16 is a sectional view of a bend of an optical waveguide device according to a tenth embodiment. FIG. 17 is a sectional view of a portion other than the bend of the optical waveguide device according to the tenth embodiment. The sectional view depicted in FIG. 16 corresponds to, for example, a sectional view taken along the line A-A of FIG. 12. The sectional view depicted in FIG. 17 corresponds to, for example, a sectional view taken along the line B-B of FIG. 12.

As depicted in FIGS. 16 and 17, grooves 71a and 71b are formed on both sides of a signal electrode 3b. The distance at a bend 4a between the signal electrode 3b and each of the grooves 71a and 71b is made shorter than the distance in another area between the signal electrode 3b and each of the grooves 71a and 71b.

As depicted in FIG. 16, for example, the distance at the bend 4a between the signal electrode 3b and each of the grooves 71a and 71b is 0. As depicted in FIG. 17, on the other hand, the distance in another area between the signal electrode 3b and each of the grooves 71a and 71b is d.

As the distance d becomes shorter, impedance increases. Accordingly, by making the distance at the bend 4a between the signal electrode 3b and each of the grooves 71a and 71b shorter than the distance in another area between the signal electrode 3b and each of the grooves 71a and 71b, a drop in impedance at the bend 4a can be controlled.

The distance at the bend 4a between the signal electrode 3b and each of the grooves 71a and 71b is made shorter in this way than the distance in another area between the signal electrode 3b and each of the grooves 71a and 71b. By doing so, the reflection of a signal can be controlled.

An eleventh embodiment will now be described. With an optical waveguide device according to an eleventh embodiment, earth electrodes having a signal electrode therebetween are connected at a bend in order to reduce signal loss.

Figure 18:
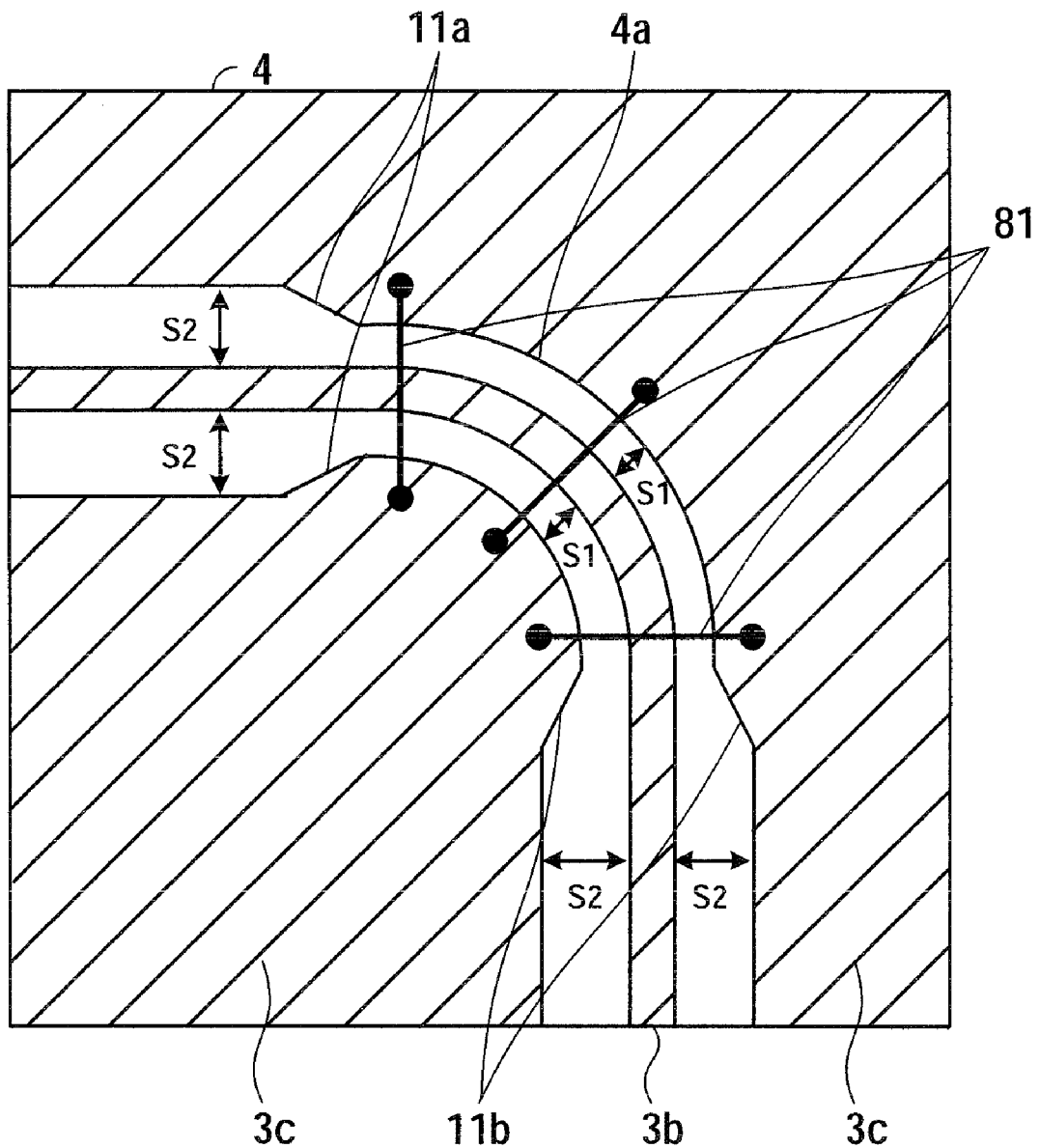
FIG. 18 illustrates a delay region of an optical waveguide device according to an eleventh embodiment.

FIG. 18 illustrates a delay region of an optical waveguide device according to an eleventh embodiment. Members in FIG. 18 that are the same as those depicted in FIG. 5 are marked with the same symbols and descriptions of them will be omitted.

As depicted in FIG. 18, earth electrodes 3c having a signal electrode 3b therebetween are connected at a bend 4a by wires 81. The wires 81 extend across the signal electrode 3b.

By connecting the earth electrodes 3c having the signal electrode 3b therebetween in this way at the bend 4a by the wires 81, grounding is performed completely and signal loss can be reduced further.

The earth electrodes 3c having the signal electrode 3b therebetween may be connected by vias.

Figure 19:
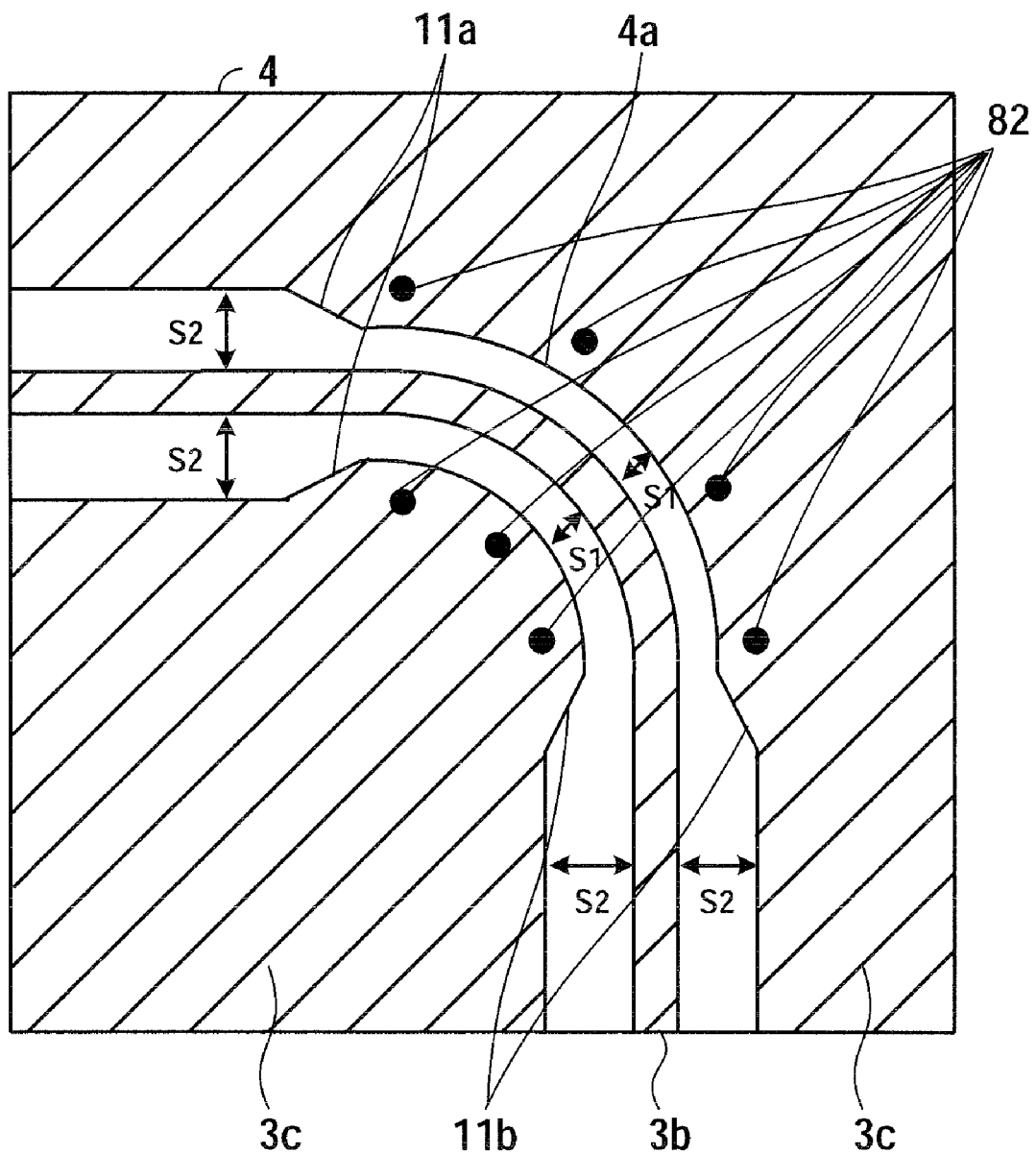
FIG. 19 illustrates a delay region of an optical waveguide device in which earth electrodes are connected by vias.

FIG. 19 illustrates a delay region of an optical waveguide device in which earth electrodes are connected by vias. Members in FIG. 19 that are the same as those depicted in FIG. 5 are marked with the same symbols and descriptions of them will be omitted.

As depicted in FIG. 19, earth electrodes 3c having a signal electrode 3b therebetween are connected at a bend 4a by vias 82. The vias 82 are connected to, for example, a reverse of a substrate 1 or a ground layer formed in the substrate 1.

By connecting the earth electrodes 3c having the signal electrode 3b therebetween in this way at the bend 4a by the vias 82, grounding is performed completely and signal loss can be controlled further.

A twelfth embodiment will now be described. With an optical waveguide device according to a twelfth embodiment, an x-cut substrate of an anisotropic material is used.

Figure 20:
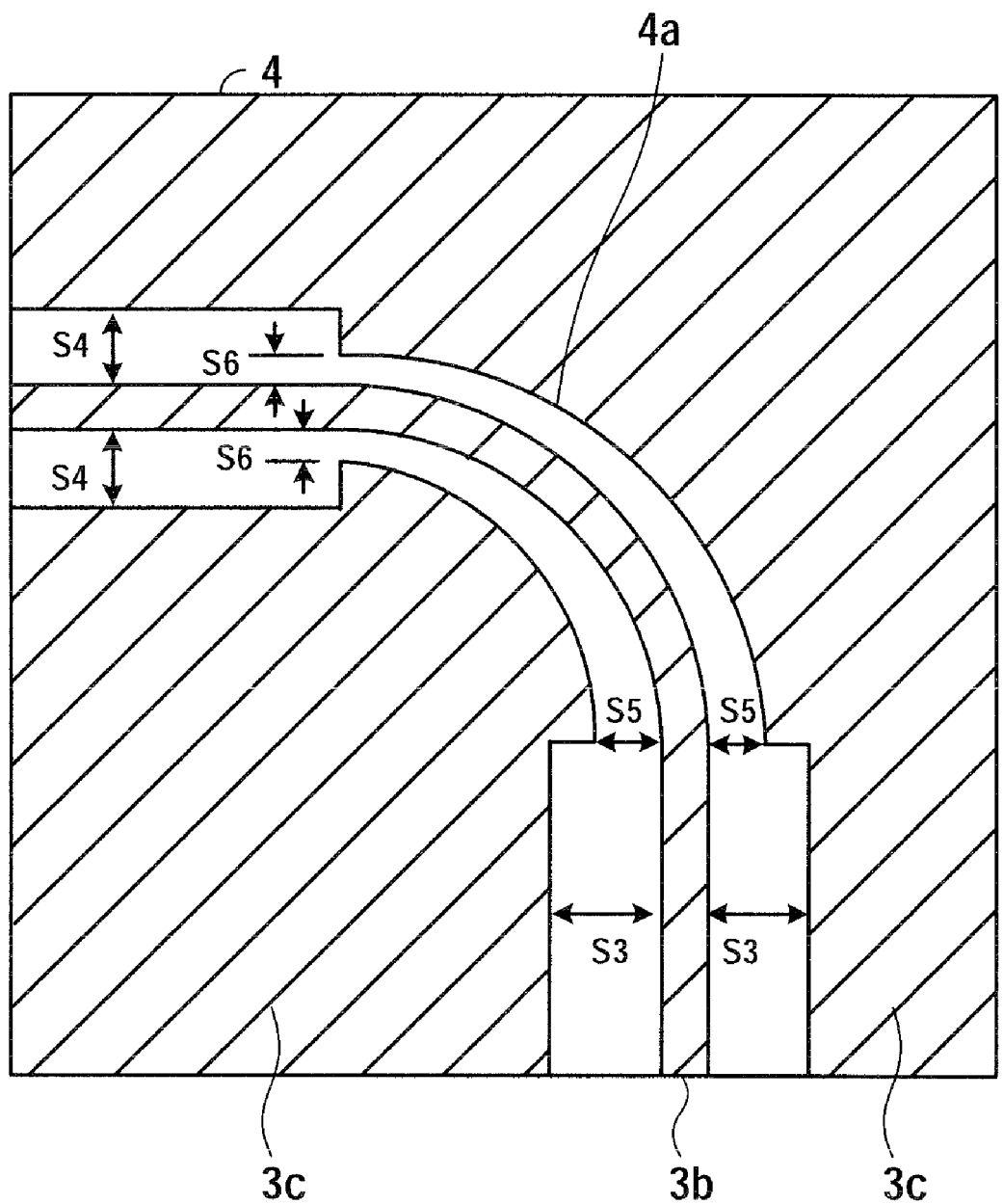
FIG. 20 illustrates a delay region of an optical waveguide device according to a twelfth embodiment.

FIG. 20 illustrates a delay region of an optical waveguide device according to a twelfth embodiment. Members in FIG. 20 that are the same as those depicted in FIG. 2 are marked with the same symbols and descriptions of them will be omitted.

If an x-cut substrate is used as a substrate 1, in FIG. 20 a dielectric constant in a vertical direction differs from a dielectric constant in a horizontal direction. If the direction of a signal electrode 3b is changed at a bend 4a, impedance changes. Therefore, as depicted in FIG. 20, a gap between the signal electrode 3b and an earth electrode 3c has widths of S3 and S4 at a portion extending from one end of the bend 4a and at a portion extending from the other end of the bend 4a, respectively, that is to say, different widths. This means that the width of the gap in a straight portion of the signal electrode 3b included in a feeder is changed according to the direction of the signal electrode 3b formed.

In order to reduce signal loss at the bend 4a, the gap at the bend 4a between the signal electrode 3b and the earth electrode 3c is made narrower than the gap in another area between the signal electrode 3b and the earth electrode 3c. To be concrete, as depicted in FIG. 20, the signal electrode 3b and the earth electrode 3c are formed so that the widths S5 and S6 of the gap at the bend 4a will be narrower than the widths S3 and S4 respectively.

In addition, in order to control a change in impedance caused by a bend of the signal electrode 3b, the width of the gap at the bend 4a is not constant and is gradually changed at a bend in the signal electrode 3b. To be concrete, as depicted in FIG. 20, the width of the gap is S6 at one end of the bend 4a, gradually widens, and is S5 (S6<S5) at the other end of the bend 4a.

As stated above, even if the substrate 1 is made of an anisotropic material, a change in impedance can be controlled and signal loss can be reduced.

By changing the widths of the signal electrode 3b at respective portions extending from both ends of the bend 4a, a change in impedance can be controlled.

Figure 21:
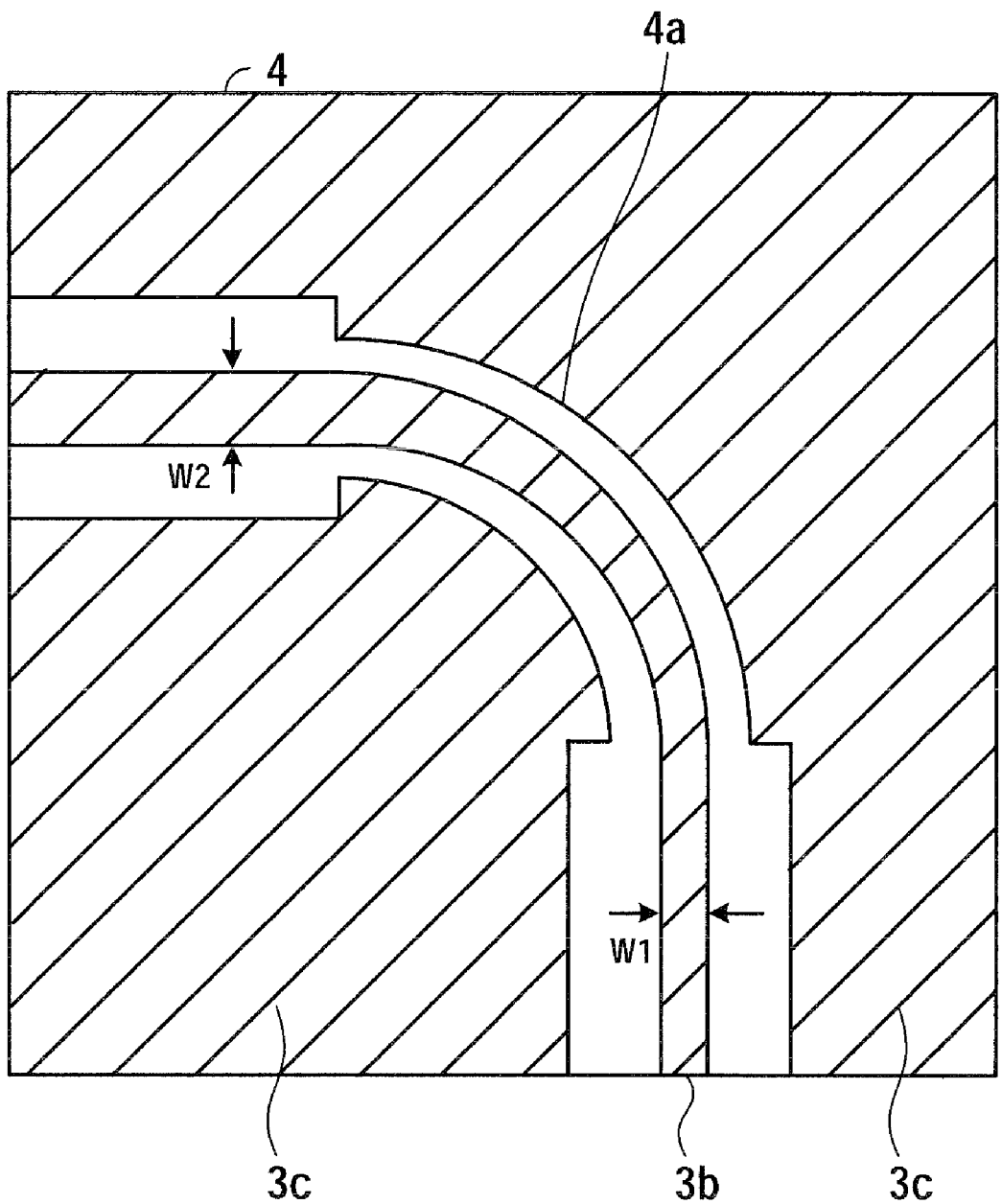
FIG. 21 illustrates a delay region of an optical waveguide device in which the width of a signal electrode is changed.
Figure 22:
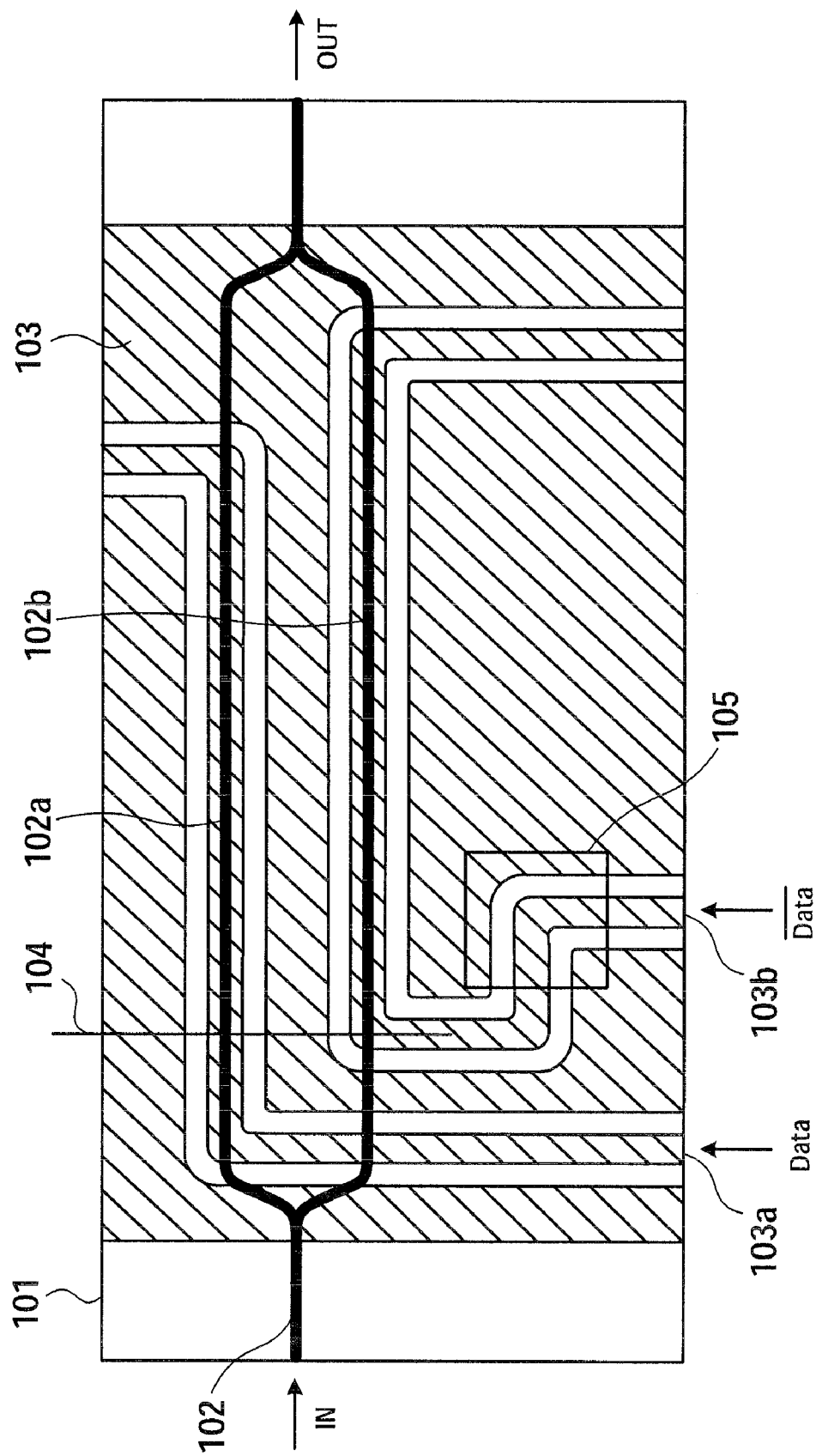
FIG. 22 is a plan view of an optical waveguide device.

FIG. 21 illustrates a delay region of an optical waveguide device in which the width of a signal electrode is changed. Members in FIG. 21 that are the same as those depicted in FIG. 2 are marked with the same symbols and descriptions of them will be omitted.

As depicted in FIG. 21, a signal electrode 3b has widths of W1 and W2 (W1<W2) at its portion extending from one end of the bend 4a and its portion extending from the other end of the bend 4a, respectively, that is to say, different widths. In addition, the width of the signal electrode 3b at the bend 4a gradually narrows from W2 to W1. As a result, even if an x-cut substrate of an anisotropic material is used as a substrate 1, a change in impedance can be controlled.

Furthermore, the width of a gap at both ends of the bend 4a is wider than the width of the gap at the bend 4a. As a result, signal loss at the bend 4a can be reduced.

Some of the first through twelfth embodiments described above may be combined. For example, grooves are formed in gaps, earth electrodes are connected by wires, and the width of the gaps at one end of a bend is different from the width of the gaps at the other end of the bend.

The above examples are related to an optical modulator. However, the above examples are also applicable to an electronic circuit for which light is not used. In this case, a dielectric through which light does not pass may be used as a substrate.

With the electronic device disclosed, signal loss at a bent portion of an electrode can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions, and alterations could be made hereto without departing from the spirit and scope of the invention.

What is claimed is:

1. An electronic device comprising:
   a signal electrode having a bent portion; and
   earth electrodes formed with the signal electrode therebetween,
   wherein a gap at the bent portion between the signal electrode and each earth electrode is narrower than a gap at both ends of the bent portion between the signal electrode and each earth electrode.

2. The electronic device according to claim 1, wherein the signal electrode and the earth electrodes are formed over or in a ferroelectric substrate.

3. The electronic device according to claim 1, wherein a plurality of signal electrodes are formed.

4. The electronic device according to claim 1, further comprising an optical waveguide formed over a substrate, wherein the gap at the bent portion between the signal electrode and each earth electrode is narrower than the gap at both ends of the bent portion between the signal electrode and each earth electrode in a front portion of an interaction area in which the signal electrode interferes with the optical waveguide.

5. The electronic device according to claim 1, wherein the gap at the bent portion between the signal electrode and each earth electrode is narrower than distance between the signal electrode and a ground layer formed on a reverse of a substrate or in the substrate.

6. The electronic device according to claim 1, wherein the gap at the bent portion between the signal electrode and each earth electrode is narrower than thickness of a substrate.

7. The electronic device according to claim 1, wherein the gap at the bent portion between the signal electrode and each earth electrode gradually narrows from both ends of the bent portion.

8. The electronic device according to claim 1, wherein the bent portion bends at right angles.

9. The electronic device according to claim 1, wherein of inner and outer gaps at the bent portion between the signal electrode and the earth electrodes, only the outer gap at the bent portion is narrower than the outer gap at both ends of the bent portion.

10. The electronic device according to claim 1, wherein width of the signal electrode at the bent portion is narrower than the width of the signal electrode at both ends of the bent portion.

11. The electronic device according to claim 1, wherein thickness at the bent portion of the signal electrode and the earth electrodes is thinner than the thickness at both ends of the bent portion of the signal electrode and the earth electrodes.

12. The electronic device according to claim 1, wherein thickness at the bent portion of the earth electrodes is thinner than the thickness at both ends of the bent portion of the earth electrodes.

13. The electronic device according to claim 1, wherein a buffer layer is formed at the bent portion between the signal electrode and the earth electrodes and a substrate.

14. The electronic device according to claim 1, wherein a buffer layer is formed between the signal electrode and the earth electrodes and a substrate except at the bent portion.

15. The electronic device according to claim 4, wherein a buffer layer is formed over the optical waveguide.

16. The electronic device according to claim 1, wherein:
   a buffer layer is formed between the signal electrode and the earth electrodes and a substrate; and
   thickness at the bent portion of the buffer layer is thicker than the thickness in another area of the buffer layer.

17. The electronic device according to claim 1, wherein grooves are formed in a substrate on both sides of the bent portion of the signal electrode.

18. The electronic device according to claim 1, wherein:
   grooves are formed in a substrate on both sides of the signal electrode; and
   the grooves at the bent portion are deeper than the grooves in another area.

19. The electronic device according to claim 1, wherein:
   grooves are formed in a substrate on both sides of the signal electrode; and
   width at the bent portion of the grooves is wider than the width in another area of the grooves.

20. The electronic device according to claim 1, wherein:
   grooves are formed in a substrate on both sides of the signal electrode; and
   distance at the bent portion between the signal electrode and each groove is shorter than the distance in another area between the signal electrode and each groove.

21. The electronic device according to claim 1, wherein the earth electrodes formed with the signal electrode therebetween are connected at the bent portion by wires or vias.

22. The electronic device according to claim 1, wherein a portion of the gap extending from one end of the bent portion has a different width from a portion of the gap extending from an other end of the bent portion.

23. The electronic device according to claim 22, wherein the gap between the signal electrode and each earth electrode gradually narrows from the one end of the bent portion to the other end.

24. The electronic device according to claim 1, wherein a portion of the signal electrode extending from one end of the bent portion has a different width from a portion of the signal electrode extending from an other end of the bent portion.

25. The electronic device according to claim 24, wherein width of the signal electrode gradually narrows from the one end of the bent portion to the other end.

26. An electronic device comprising:
   a first electrode having a bent portion; and
   second electrodes formed with the first electrode between,
   wherein a gap at the bent portion between the first electrode and each second electrode is narrower than the gap at both ends of the bent portion between the first electrode and each second electrode.

* * * * *